United States Patent
Zalewski

(10) Patent No.: US 8,313,377 B2
(45) Date of Patent: Nov. 20, 2012

(54) PLAYING BROWSER BASED GAMES WITH ALTERNATIVE CONTROLS AND INTERFACES

(75) Inventor: Gary M. Zalewski, Oakland, CA (US)

(73) Assignee: Sony Computer Entertainment America LLC, Foster City, CA (US)

( * ) Notice: Subject to any disclaimer, the term of this patent is extended or adjusted under 35 U.S.C. 154(b) by 316 days.

(21) Appl. No.: 12/579,343

(22) Filed: Oct. 14, 2009

(65) Prior Publication Data

US 2011/0086706 A1    Apr. 14, 2011

(51) Int. Cl.
     *A63F 13/00*      (2006.01)
(52) U.S. Cl. .............. 463/36; 463/29; 463/39; 463/42
(58) Field of Classification Search .............. 463/29, 463/36, 39, 42
See application file for complete search history.

(56) References Cited

U.S. PATENT DOCUMENTS

| | | | |
|---|---|---|---|
| 6,965,368 B1 * | 11/2005 | Andrews et al. | 345/156 |
| 2002/0133694 A1 * | 9/2002 | Ray et al. | 713/1 |
| 2007/0184899 A1 * | 8/2007 | Rantapuska | 463/30 |
| 2008/0256451 A1 * | 10/2008 | Chu et al. | 715/722 |
| 2009/0254682 A1 * | 10/2009 | Tseng et al. | 710/11 |
| 2009/0298582 A1 * | 12/2009 | Dempsky et al. | 463/29 |
| 2011/0107239 A1 * | 5/2011 | Adoni et al. | 715/757 |

* cited by examiner

*Primary Examiner* — James S McClellan
(74) *Attorney, Agent, or Firm* — Martine Penilla Group, LLP

(57) ABSTRACT

Methods, systems, and computer programs for playing browser based game with alternative controls and interfaces are presented. In one method, a definition of native inputs defined for the game is received. The native inputs are originated in a native device and are capable of causing actions in the game. Further, the method detects an alternate device that does not have all the native inputs. The native inputs are mapped from the native device to alternate inputs from the alternate device. The inputs generated with the alternate device are translated to corresponding native inputs according to the mapping and causing the corresponding actions in the game. In another method, a game area inside a web page is identified for playing the game. The game area is expanded by increasing the size of the game area while decreasing the size of other elements in the web page.

27 Claims, 15 Drawing Sheets

Emily's Web Games

Search  Rate  Multiplayer  Friends online  News  New Games  By category

LAST 5 GAMES PLAYED

| Game | Site | Score |
|---|---|---|
| Magnets | a.com | 22346 |
| Karate | b.com | 1000 |
| Man-pac | c.com | 97000 |
| Rain | d.com | 34567 |
| Formula 1 | e.com | 800 |

MOST PLAYED GAMES IN PS3 NETWORK

Fist    Vegas
Diamonds    Invasion
Tennis    Chess

EMILY'S FAVORITES

GP250    Champions    Vegas
Ninjas    Ghostie    Diamonds

SAVED GAMES (15)

Diamonds
Ninjas
Bomber

NEW-GAME SUGGESTIONS

| Game | Category | Site |
|---|---|---|
| Burger joint | Puzzle | xyzgames.com |
| Megapolis | Life | buildmega.com |
| Blind detective | Puzzle | joesgames.com |

Advertising

Fig. 6

Input Mapping Table — 702

| Action | Keyboard | Mouse | Wand Cont. | Body language | ... |
|---|---|---|---|---|---|
| Move left | A | Move left | Point Left | Move left hand | |
| Move right | S | Move right | Point Right | Move right hand | |
| Move down | D | Move down | Point Down | Crouch | |
| Jump | F | Left click | Point up | Jump | |
| Climb | F | Move up | △ | Legs up and down | |
| Shoot | (space) | Right click | ✕ | Thumb up and down | |
| Shield | Alt | Both click | ○ | Forearm covers face | |
| Pause | Esc | | ▲ | Back to the camera | |
| ... | | | | | |

Fig. 7

PLAYING BROWSER BASED GAMES WITH ALTERNATIVE CONTROLS AND INTERFACES

BACKGROUND

1. Field of the Invention

The present invention relates to methods, systems, and computer programs for playing browser-based games, and more particularly, systems, and computer programs for playing browser-based games using alternative controls and enhanced interfaces.

2. Description of the Related Art

A browser game is a video game that is played on a web browser. It is distinct from other video and computer games in that the browser game typically does not require any client software installation besides the web browser. Some games rely solely on client-side technologies such as JavaScript or common plugins such as FLASH™ Player or Java™, while others make use of some server-side scripting. Games that use server-side computing include massively multiplayer games or simple two-player board games where the user plays the server computer or a second player. Client-side games are typically single-player games. A game played in a browser is often called a browser-based game (BBG).

One key advantage of BBGs is that there is a large user community with access to web browsers on their computers. Web browsers are hardware independent, thus a BBG can be played in many types of computers and hardware architectures without requiring expensive platform customizations. Additionally, games are easily downloaded over the internet as their complexity tends to be moderate and file sizes small enough to allow players the download of games without long waits.

On the other hand, BBGs have certain disadvantages. Since the games are designed for a generic browser platform, game features are constrained by the limited functionality offered by the browser. For example, most BBGs use keyboard or mouse inputs, which may be less than ideal for some games, such as shooting games. Additionally, the user interface of BBGs is constrained by the browser. Often, the playing area is small because it is surrounded by advertising and other web features, as many of these games are free and developers rely on advertising revenue to support their websites.

It is in this context that embodiments of the invention arise.

SUMMARY

Embodiments of the present invention provide methods, systems, and computer programs for playing browser based game with alternative controls and interfaces. It should be appreciated that the present invention can be implemented in numerous ways, such as a process, an apparatus, a system, a device or a method on a computer readable medium. Several inventive embodiments of the present invention are described below.

In one embodiment, a definition of native inputs defined for the game is received. The native inputs are originated in a native device and are capable of causing actions in the game. Further, the method detects an alternate device that does not have all the native inputs. The native inputs are mapped from the native device to alternate inputs from the alternate device. The inputs generated with the alternate device are translated to corresponding native inputs according to the mapping and causing the corresponding actions in the game. In another embodiment, a computer program performs the method's operations.

In another embodiment, a game area inside a web page is identified for playing the game. The game area is expanded by increasing the size of the game area while decreasing the size of other elements in the web page.

In yet another embodiment, a method includes an operation to receive the input parameters for the game. Further, native input keys for the input parameters are determined, where the native input keys are defined for a native input control device. The native input keys are mapped to a non-native control device, and input is detected from the non-native control device. After the input is detected, a method operation translates the detected input to native input keys. The mappings for the native input keys are maintained for translating the detected inputs during the game play to simulate the native input control device with the non-native control device.

In yet another embodiment, a system for playing a browser based game (BBG) includes a game information retrieval module and an input conversion module. The game information retrieval module receives a definition of native inputs for the game. The native inputs are capable of causing an action in the game and are tied to actions through a native device. Additionally, the input conversion module maps the native inputs from the native device to a plurality of alternate inputs from an alternate device which does not have the native inputs. Thus, the input conversion module translates inputs generated with the alternate device to corresponding native inputs according to the mapped native inputs.

Other aspects of the invention will become apparent from the following detailed description, taken in conjunction with the accompanying drawings, illustrating by way of example the principles of the invention.

BRIEF DESCRIPTION OF THE DRAWINGS

The invention may best be understood by reference to the following description taken in conjunction with the accompanying drawings in which:

FIG. 6 shows an embodiment of a personal BBG portal.

FIG. 7 illustrates an input mapping table for translating commands received with alternate input devices, according to one embodiment.

DETAILED DESCRIPTION

The following embodiments describe a method and apparatus for playing browser based game with alternative controls and interfaces. It will be obvious, however, to one skilled in the art, that the present invention may be practiced without some or all of these specific details. In other instances, well known process operations have not been described in detail in order not to unnecessarily obscure the present invention.

Figure 1:
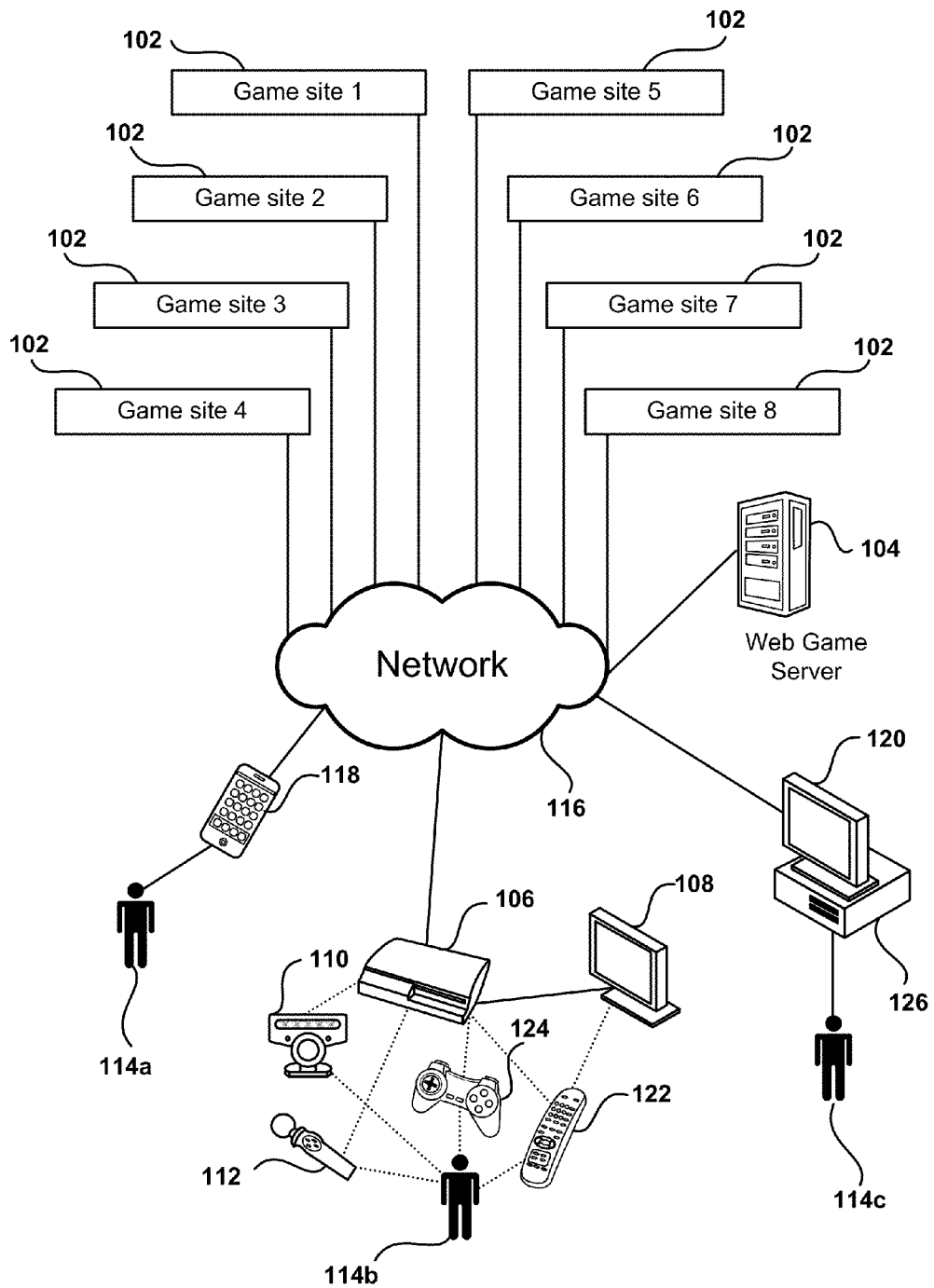
FIG. 1 shows a schematic diagram of a networked environment for playing Browser Based Games (BBG), according to one embodiment.

FIG. 1 shows a schematic diagram of a networked environment for playing Browser Based Games (BBG), according to one embodiment. Web servers 102 hosted by game providers deliver web pages to users 114a-114c using standard http (Hypertext Transfer Protocol) transfers. The web pages include the code for playing the BBGs in one of many devices with web browsing capabilities. In some cases, users have input devices that are cumbersome for browsing the internet. For example, a player with a game controller may be able to select a web page address in a browser using software that selects one letter at a time from an alphabet display. Additionally, the player with the game controller may not be able to play the BBG with the game controller as these games are usually designed for keyboard and mouse inputs.

Embodiments of the invention allow players using web browsers and multiple types of input devices to easily access and play BBGs. Thousands of web based games are available on the Internet in many different game web sites 102. Embodiments of the invention assist users in finding and selecting games across many of these websites, as well as letting users save the progress of browser-based games. More specifically, embodiments of the invention facilitate accessing, starting, and playing FLASH based games on a television, a game console, or any other input device that may not have mouse and keyboard input devices.

Although embodiments of the invention are described below using input mappings for keyboard and mouse, the principles of the invention can be applied to translating inputs from any device to any other device. For example, a game designed to be played with a game controller could be played by making gestures that are captured by a camera and translated to the corresponding game controller inputs. We refer to the device that creates the inputs expected by the game as a native device. In the case of a standard desktop computer, the native devices are usually the keyboard or the mouse. The native device generates native inputs, such as pressing a key or clicking a mouse. Further, the device whose inputs are being translated to play a game is referred to herein as an alternate device, or alternative device, which generates alternate inputs. Sometimes we may refer to a player making gestures as an alternate device for simplification purposes, meaning that the gestures are captured by a camera and interpreted by a computer program. The embodiments presented should therefore not be interpreted to be exclusive or limiting, but rather exemplary or illustrative.

Web game server 104 provides information related to BBGs. Some of the services provided by web game server 104 include providing a central location for searching web games in multiple web sites; creating a community game site for exchanging game information and ratings; caching some of the web pages so games can be downloaded from web game server 104; saving player scores; providing user statistics; downloading supplemental content for the web game pages such as advertising; etc. The person skilled in the art will readily appreciate that different web game server implementations will provide different sets of services. In one embodiment, a game web server is not required to provide game playing functionality and all the enhanced playing services are delivered by the client device used by the player.

Probably the most popular plugin for playing browser games is Adobe's FLASH Player, which allows viewing animations and movies within web browsers. FLASH Player, or a browser with a FLASH player plugin, runs files with the SWF extension. These SWF files can be created by a number of tools, such as Adobe's Flash authoring tool. Adobe FLASH, or simply FLASH, refers to both a multimedia authoring program and the Adobe FLASH Player, which uses vector and raster graphics, a native scripting language called ActionScript and bidirectional streaming of video and audio. FLASH is a common format for games, animations, and Graphical User Interfaces (GUI) embedded into web pages. The FLASH Player is available as a plugin for recent versions of web browsers, such as Mozilla Firefox, Opera, Safari and Internet Explorer, on multiple hardware platforms.

Players can access BBGs through any device that includes a browser, such as mobile phone 118, game console 106, Personal Computer (126), Personal Digital Assistants (PDA), laptops, workstations, etc. Although BBGs are often designed for mouse and keyboard inputs, embodiments of the invention allow players 114a-114c to use keyboards and mice as well as other methods and devices for interfacing with the games. These devices include a touch screen or a numeric keypad, camera 110 (to capture player movement and sound), two-handed controller 124, single-hand controller 112, remote control 122, etc.

In one embodiment, the game provider can make available information regarding mappings for alternate devices. The game developer can apply a plugin application for the BBG that allows the user select an option to select an alternate device and the plugin identifies the mappings for that alternate device. For example, the user may use any controller via a wireless connection using a Bluetooth device connected to the system. Further, the alternate device may be a camera with the corresponding software for motion detection to allow the user to perform inputs via gestures. The game developer can then provide an option for the user to use gestures, and if the player selects this option, the game displays to the user the gestures that can cause game actions. For example, the game may describe that there are four things the player needs to do with the hands to interface with the game. To move left, move the left hand away from the body, to move right, move the right hand away from the body, to break put both hands in front of you, etc.

Figure 2A:
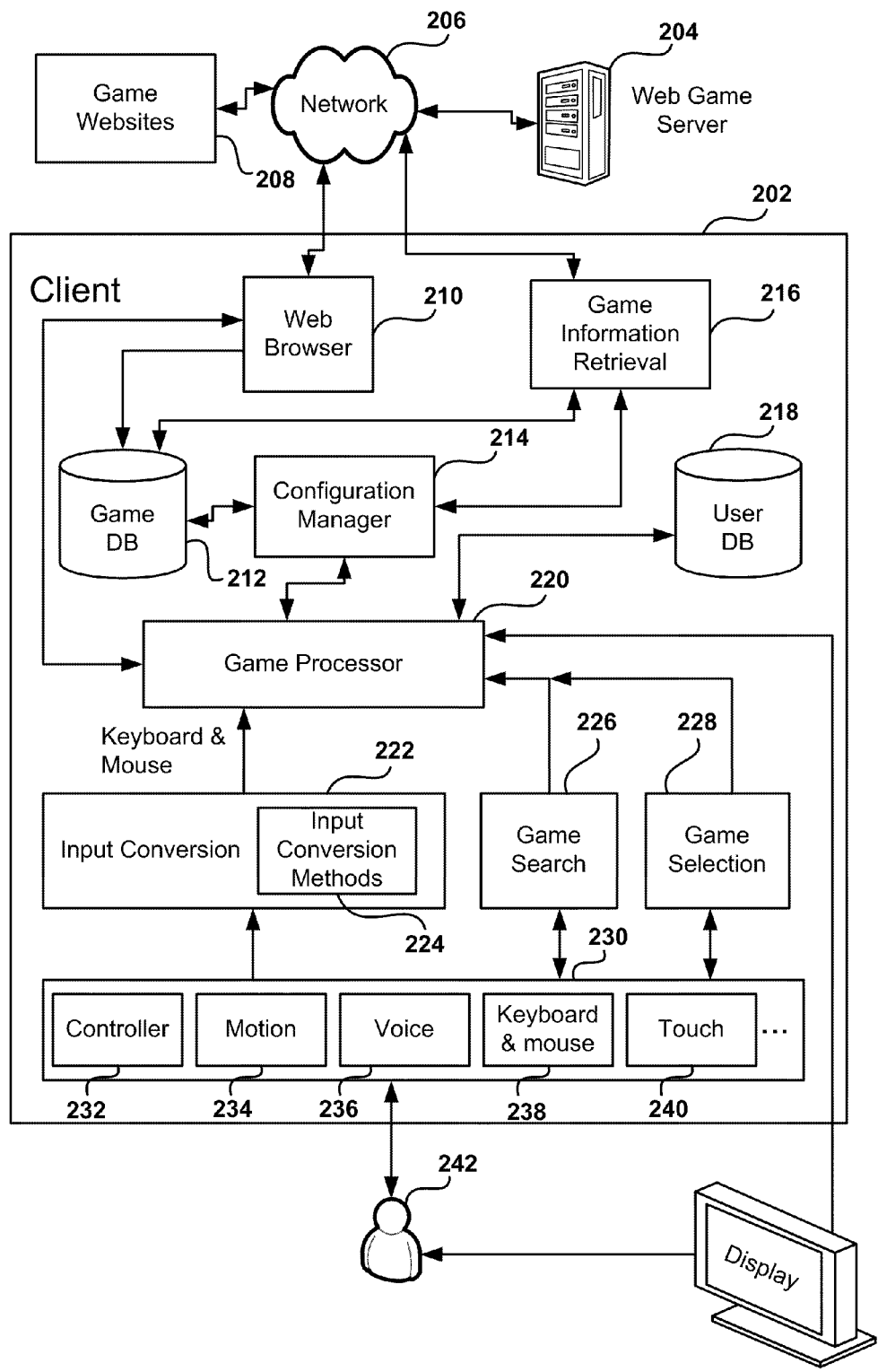
FIGS. 2A-2C illustrate one embodiment of the client architecture for playing BBGs.
Figure 2B:
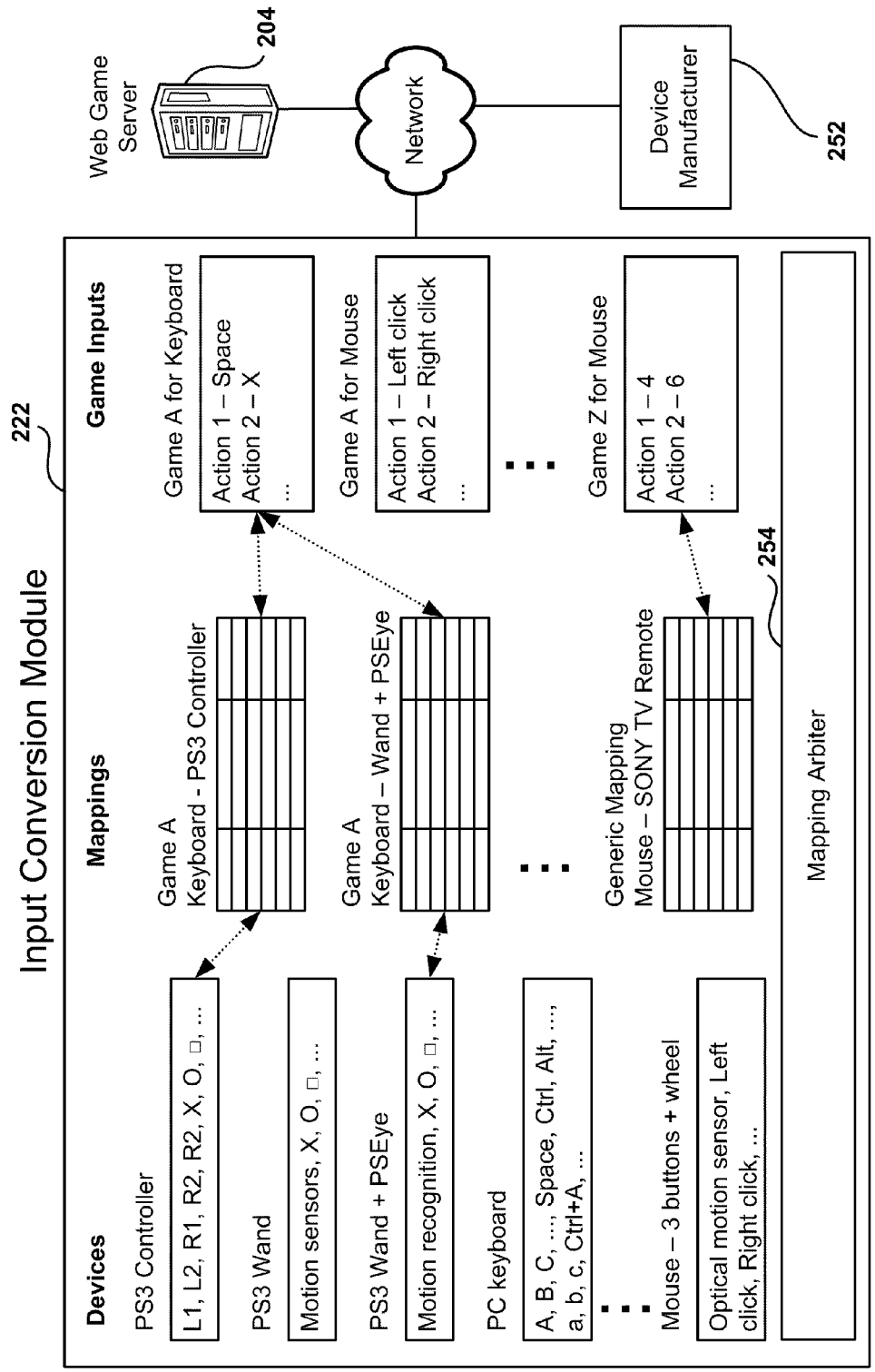
Figure 2C:
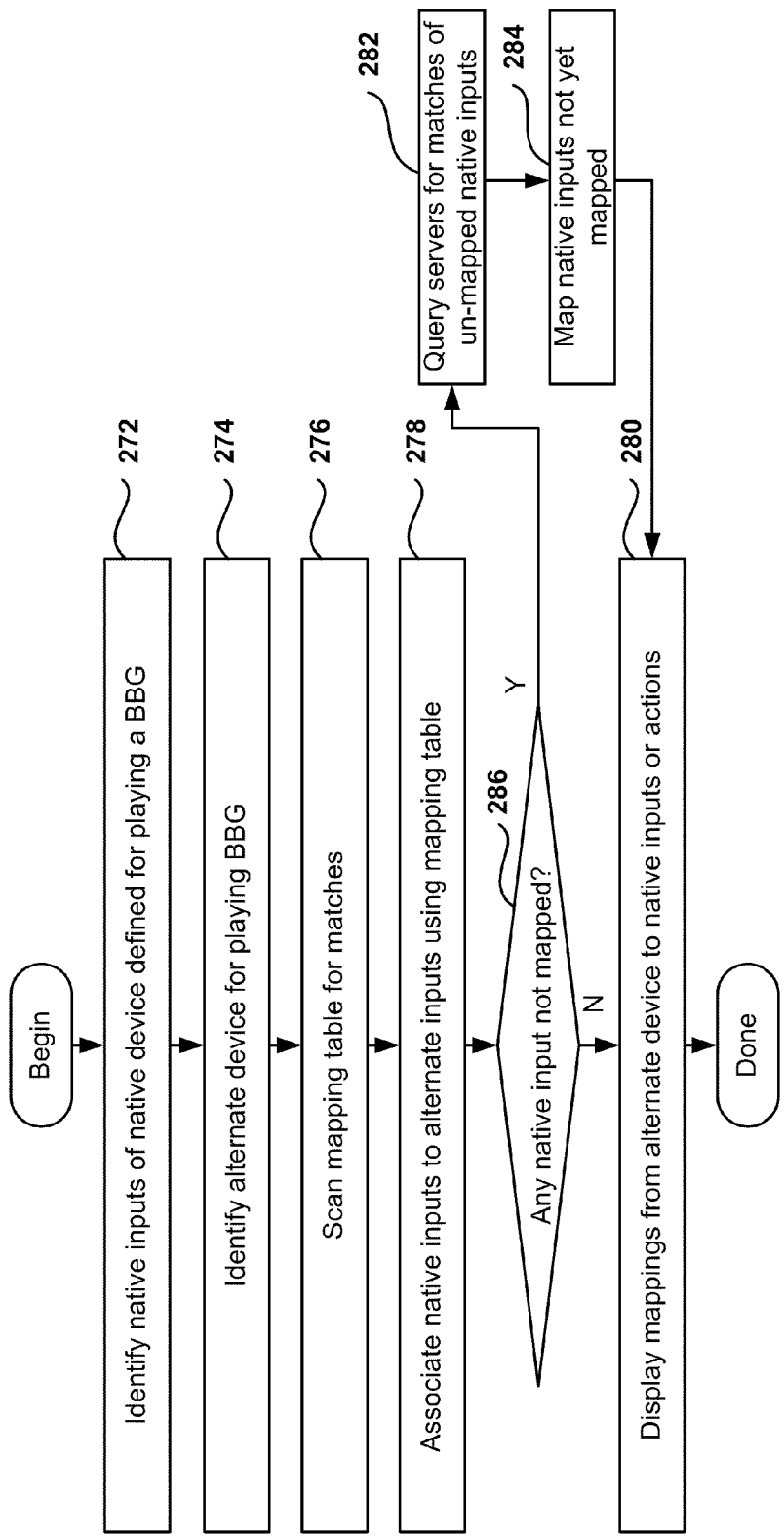

FIGS. 2A-2C illustrate one embodiment of the client architecture for playing BBGs. Client 202 access game websites 208 via network 206 to download browser based games requested by player 242. Web game server 204 can provide additional game information to client 202 as well as collect game information from client 202, as previously described in reference to FIG. 1. Game processor 220 coordinates the different game-related activities within client 202, such as presenting game options to the user, downloading BBGs, playing BBGs with an enhanced layout for playing, saving games, reporting scores to web game server, etc.

Web browser 210 is an enhanced browser for retrieving, presenting, and traversing information resources on web servers. Web pages including BBGs are downloaded from game websites 208 using standard web protocols, such as Hypertext Transfer Protocol (HTTP). The downloaded web pages can be stored in game database 212. Web browser 210 can also retrieve web pages and games from game database 212, and add elements to the web pages downloaded from game websites 208, such as advertising downloaded from web game server 204. Additionally, game processor 220 can pause a game and store the status of the game in game database 212. Enough information is stored in game database 212 so the game can be restarted exactly from the same state the game had when the game was paused. This state includes the state of the web page components, including the state of the FLASH player.

Configuration manager 214 enables user 242 to configure the different options for playing BBGs, such as creating a user profile and user id, selecting BBG websites, saving user logins in the BBG websites, identifying favorite games, entering social network information, customizing input devices, etc. User database 218 is used to store the user related information. Game information retrieval 216 module obtains game related information from web game server 204 and game websites 208. For example, game information retrieval 216 gets information related to game statistics, new games, new websites, user ratings of games, etc.

Input from user 242 is received by input processor 230. The user input can be of different kinds, and modules inside input processor 230 are defined to handle the different types of input. For example controller module 232 interfaces with the user via a game controller, motion module 234 captures user movements via a camera or some other environment sensing device, voice module 236 processes voice commands from the user received via microphone, keyboard and mouse module 238 processes keyboard and mouse inputs, touch module 240 processes touches on a display screen or mouse pad, etc.

Input processor 230 transmits the inputs to input conversion module 222, game search module 226, and game selection module 228. Input conversion module 222 converts the user inputs into information that is used by game processor 220 and web browser 210. For example, a button activation on a controller is translated to an equivalent keyboard input (such as the left arrow key) for playing a game that only accepts keyboard inputs. Input conversion module 222 includes input conversion methods 224 that define, for each game, how the inputs from the user are translated. More details regarding the input conversion methods are described below in reference to FIGS. 2B and 7.

Game search module 226 is used for searching games in game database 212, game websites 208, and web game server 204. A sample interface for the game search module is presented below in FIG. 8. Game selection module is used to select games for playing that can be downloaded from the web or from game database 212. One embodiment of a game selection web page is presented below in FIG. 6.

FIG. 2B illustrates one embodiment of input conversion module 222. Mapping arbiter module 254 determines the mappings required to play a BBG with an alternate Device. Input conversion module 222 includes device, mappings and game inputs tables. Each entry in the device table includes and input layout for the corresponding device. The input layout includes all or a subset of the possible inputs that can be performed with the device. For example, a keyboard device may include a list of all the uppercase letters, lowercase letters, space bar, Ctrl key, etc. A PS3 controller may include a list of all the buttons, joystick movements, etc.

The game input has an entry for each pair BBG-native device. These entries correspond to the definition given by the BBG provider to play with the native device. Mapping Arbiter 254 builds or downloads the mapping table entries. Each mapping table entry describes the mapping between a native device and an alternate device to play the corresponding game. Additionally, there can be generic mappings between two different devices that are not tied to a specific game. This way, the generic mapping can be used as a starting point to play new games with the alternate device. One embodiment of the mapping tables is described below in detail with respect to FIG. 7.

In one embodiment, mapping arbiter 254 downloads the mapping entry for one game from web game server 204. The mappings can be modified by the player according to player's preferences. The player can override the values on the table or create a separate entry. In another embodiment, mapping arbiter 254 detects the alternate device being used by the player and downloads device configuration from a device manufacturer site. Once the layout of the device is known, mapping arbiter 254 builds a mapping table entry for playing a BBG with the detected alternate device. Each of the actions defined in the game and the corresponding native input are assigned a different input chosen from the downloaded device layout. The input layout can include a graphical representation to enable the user to change the settings with a graphical user interface.

It should be appreciated that the embodiments illustrated in FIGS. 2A and 2B are exemplary module components of a client for playing BBG. Other embodiments may utilize different modules, or may arrange the communications and interfaces in varying manners. The embodiments illustrated in FIGS. 2A and 2B should therefore not be interpreted to be exclusive or limiting, but rather exemplary or illustrative.

FIG. 2C illustrates one embodiment of a method for matching native inputs with alternate inputs. In operation 272, the input conversion module identifies the native input associated with a BBG, and which native inputs from the native device are used for playing the BBG. The alternate device for playing the game is identified in operation 274. Once the native inputs and the alternate device are identified, the arbiter in the input conversion module scans the mapping tables to see if there is an entry for the BBG, native device, and alternate device. If the specific entry is not found, the arbiter will also scan for a generic game mapping entry. In one embodiment, the arbiter will also scan entries for other games that use the native device and the alternate device. In operation 278, the arbiter associates native inputs to alternate inputs using the results from the scan of the mapping table.

The method checks in operation 286 if there are any native inputs not yet mapped. The arbiter may have no mappings identified, or a partial list of mappings. For example, the arbiter may have matched the arrow keys from a keyboard to directional buttons on a game controller, but the arbiter still has not matched the space bar from the keyboard to a corresponding button on the controller. If there are still some unmapped native inputs, the method flows to operation 282, and to operation 280 otherwise.

In operation 282, the arbiter queries a server, or servers, for matches for the native inputs not yet mapped. The server may belong to a device manufacturer, game manufacturer, console manufacturer, etc. Once this information is collected, the arbiter maps the native inputs not yet mapped 284 with the information received from the server. In one embodiment, the arbiter only receives information regarding the alternate device because there is no mapping information. In this case, the arbiter may start with a random mapping and then let the user customize accordingly. In another embodiment, the arbiter uses predetermined probabilistic assignments between the native inputs and the alternate inputs. The arbiter is defined to make a determination when there are equal or similar probabilities that a certain native input maps to an alternate input in the alternate device.

The arbiter may also consider the type of game being played and the expected use and frequency of the native inputs. The arbiter may select an alternate input that is triggered in a similar action as the native input, such as using the same finger on the same hand. The arbiter may make a determination between two buttons on the alternate device based on knowledge of the most frequently used button for a particular game. For example, if a game requires a button to be pushed often, the arbiter may select an alternate input closer to the thumb instead of using a button closer to the index finger. In the case that the game is tied to frequent motion, such as in a driving game, and the alternate device has a joystick, the arbiter may perform a different assignment if the alternate device has motion sensing capabilities, such as a gyro, an inertial sensor, etc. In this case, the arbiter will use controller motion to translate to game motion actions, so the user can hold the controller as a steering wheel.

In another embodiment, the arbiter interfaces with the browser to identify where the browser is accessing game information and downloads. The arbiter may then analyze the game provider as well as game identification to determine the type of game. Once the arbiter determines the type of game, the arbiter associates this type of game and proceeds to perform mappings that best match the type of game, as previously discussed.

Once all the mappings are complete, the mappings from the alternate device to native inputs or actions are displayed to the user in a list form or using a graphical representation of the alternate device and showing how the different native inputs or game actions are created with the alternate device.

Figure 3:
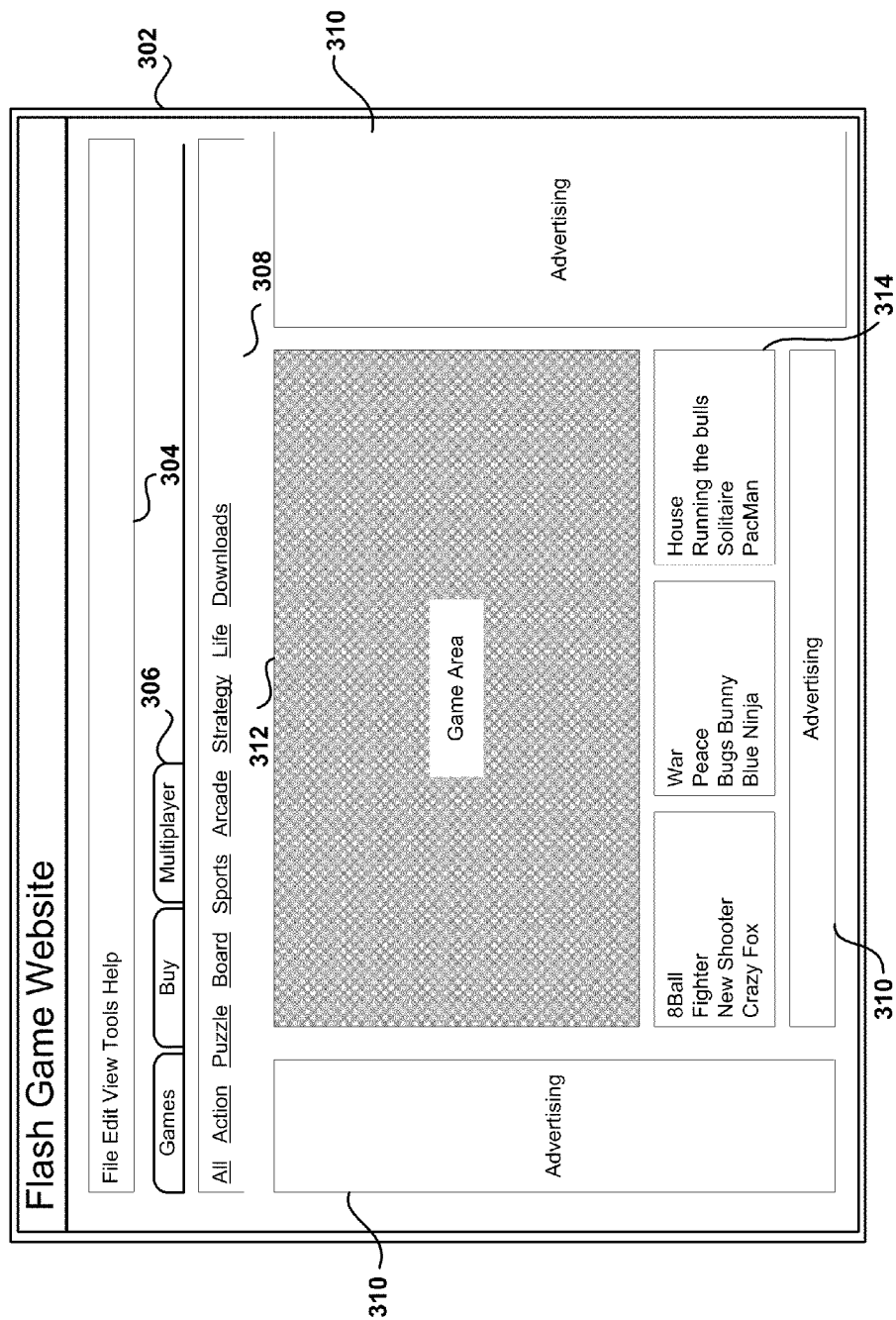
FIG. 3 depicts a game web page for playing FLASH™ games, according to one embodiment.

FIG. 3 depicts a game web page for playing FLASH™ games, according to one embodiment. Web page 302 is displayed on a computer browser and includes several elements. A menu bar 304 enables the user to enter commands or to access submenus for performing browser-related operations. Tabs 306 enable the user to select options within the web page, to select a different area of the website, or to select a different set of options. For example, the embodiment shown in FIG. 3 includes a Games tab to select a page for playing games, a Buy tab to go to a game buying page in the website, and a Multiplayer tab that transitions the browser to an area for playing multiplayer games.

A game category selection menu 308 enables the user to enter commands related to the web page, as opposed to menu bar 304 that is used to enter commands for the browser. Game area 312 where games are played is situated in the center of the web page in a prominent position. In one embodiment, game area 312 is linked to a FLASH file for playing a FLASH game. Advertising areas 310 display commercial messages and can be located in different parts of the page, such as the left side, the right side, the bottom, the top (not shown), etc. The commercial messages can be shown in different formats such as text, graphic banners, video displays, graphic animations, etc. The advertising can be downloaded from the same server as the game server or from advertising delivery servers.

Game selection region 314 is used to select a game. The embodiment of FIG. 3 illustrates a text selection menu, but other menus area available, such as graphics, animations, pull-down menus, scroll bars, etc. In another embodiment, the game selection is performed in a separate webpage, and once a game is selected by the player, the page that includes game area 312 is downloaded.

It should be appreciated that the embodiments illustrated in FIG. 3 are exemplary layouts for a BBG page. Other embodiments may utilize different fields, or may arrange the page elements in varying manners. The embodiments illustrated in FIG. 3 should therefore not be interpreted to be exclusive or limiting, but rather exemplary or illustrative.

As seen in FIG. 3, the playing area is often surrounded by many elements that add noise to the playing experience. Some games required quick timing or the handling of small items. These operations are harder to perform in small viewing areas and the game playing experience degrades as a consequence. A bigger game playing area would improve the playing experience.

Figure 4:
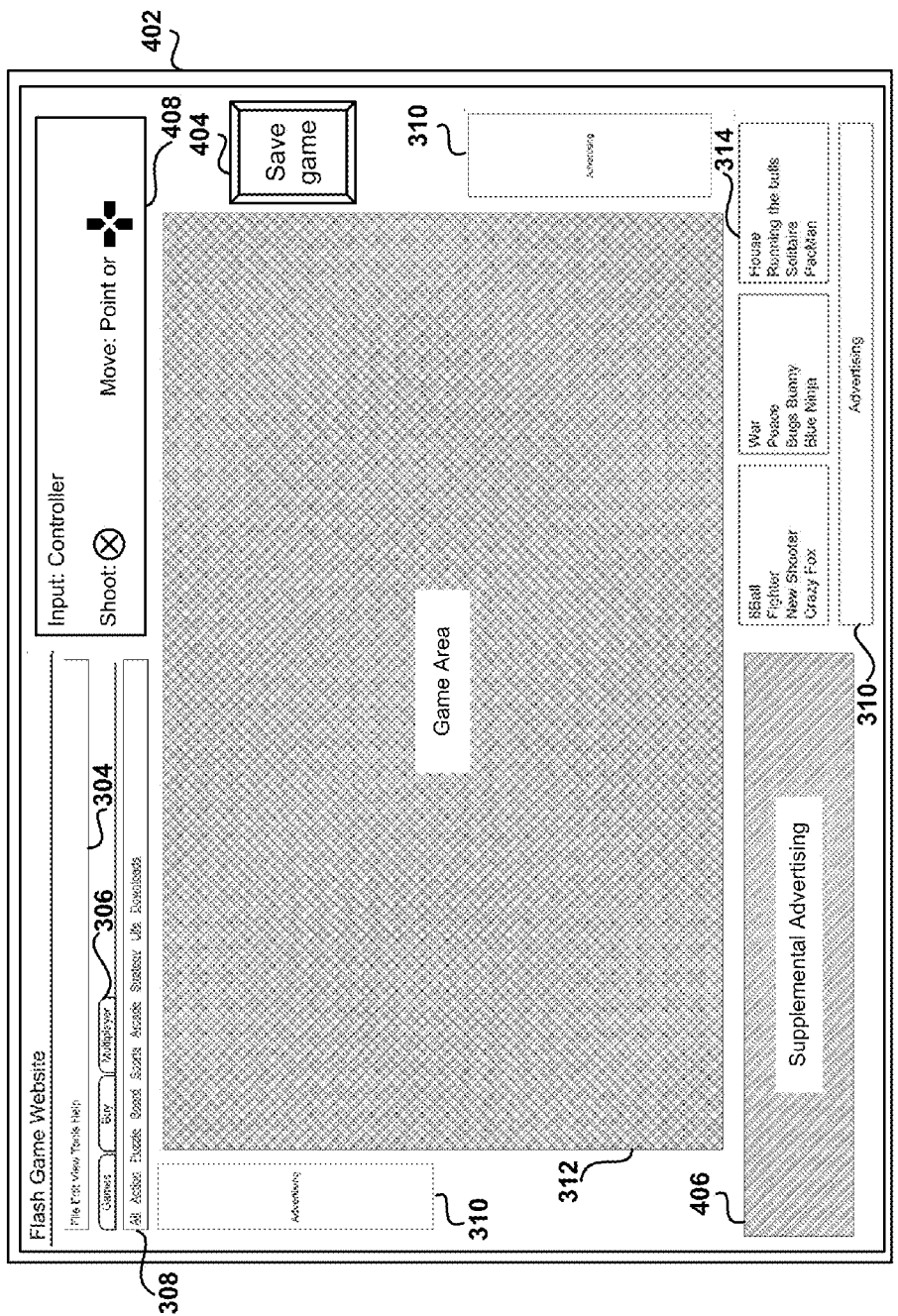
FIG. 4 illustrates a modified web page for playing web games in accordance with one embodiment of the invention.

FIG. 4 illustrates a modified web page for playing web games in accordance with one embodiment of the invention. Enhanced web page includes 402 the elements in web page 302 of FIG. 3 plus additional elements used by the enhanced browser at the client. In one embodiment, such as the one shown in FIG. 4, the relative sizing of the elements in FIG. 3 has changed to increase the size of game area 312. Other elements not related to game playing have been reduced in size by a constant factor, such as ½, although other values are also possible. In another embodiment, not all the elements are reduced by the same proportion. For example, menu bar 304 is not changed to allow the user to access browser commands easily. In yet another embodiment, the scaling of the game area is based on the screen resolution of the target display in order to maximize display surface and to optimize the rendering of the pixel resolution provided by the game.

The additional elements are added by enhanced browser in the client device. An input summary region 408 details the input selected (controller) for playing these games and the instructions for using the input device. The embodiment shown in FIG. 4 shows that a controller has been selected as the input device. The controller can be a two-hand controller or a wand (single hand) controller. The action "Shoot" in the game is performed by pressing the X button, and motion can be performed either by pointing the wand controller of by using the motion keys.

Another addition is the save game button 404 which allows the user to save a game in progress. BBGs are not geared for saving status or scores. Some basic functionality may be achieved by using browser cookies or by saving information on the server. The browser cookies can store basic information such as a level reached in a game, but can not be used for saving the exact state of the game, which can be retrieved later. Saving information in web servers is not common as these web servers tend to serve thousands or millions of games and the saving and retrieval of game state would be very costly. Since browsers often run on powerful systems, it is possible to use these powerful systems to store the status of the games. The enhanced browser at the client saves the complete state of the game being played. In the case of a FLASH game, this means saving the complete memory status and any other related information required to be able to later restore the game without the FLASH player needing to be aware of the temporary halt in playing the game.

Another added element is the Supplemental advertising region 406, which places advertising messages downloaded from the same server as the game or from a different server, such as the independent web game server of FIGS. 1 and 2. In another embodiment, game area 312 is expanded as much as possible to fit in the display, and some of the original webpage elements may be hidden during play.

Figure 5:
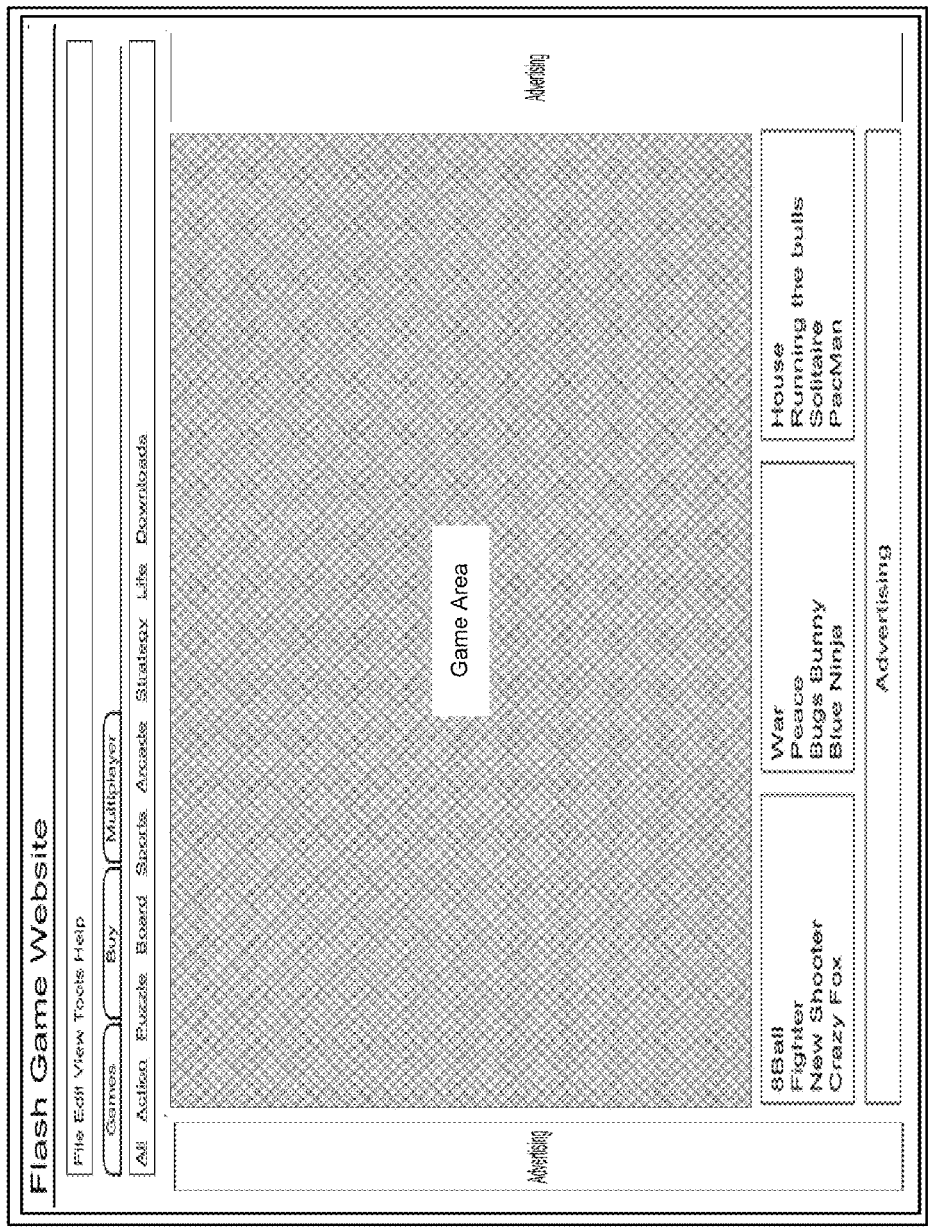
FIG. 5 illustrates a modified web page with an enlarged game playing area, according to one embodiment.

FIG. 5 illustrates a modified web page with an enlarged game playing area, according to one embodiment. The game area has been expanded while every other element in the page has been reduced to make room for the bigger game area. A zoom effect is used to zoom-in in the game area, while the other elements are "zoomed-out." This results in distortion of the elements outside the game area.

FIG. 6 shows an embodiment of a personal BBG portal. In one embodiment, the personal BBG portal is created at the client with the information available at the client, as shown in FIG. 2A. In another embodiment, the personal BBG portal is created at a central server, such as web game server 204 of FIG. 2A, or is created with a combination from the information at the client and the information at the web game server. A BBG menu region 604 enables the player to select game related options, such as searching games, rating games, playing with other players, finding friends online, etc. Last game played region 606 gives a quick access to the last 5 games played. Hyperlinks for each of the games allow the player to quickly load a page for the BBG requested. A list of all the games saved is shown in saved games region 614, where a scroll bar allows the user to browse through the saved games.

Favorites region 610 presents the games that the player has added to her favorites list. A scroll bar or other navigation buttons can be added if the number of favorites exceeds the area available on the screen. Additionally, the games may be displayed in list form to present more games at one time on the screen. Clicking on any of the games will load the corresponding page for the game. The system can also provide suggestions to the player for new games. New-game suggestions area 612 lists some possible game ideas for the player. The algorithm for selecting suggestions is based on the knowledge of the history of games played as well as information on new games available on the web. The algorithm takes into account the types of games (puzzle, battle, driving, etc.) played to suggest similar games to the player. The algorithm also takes into account the popularity and ratings of games by other players. In addition, the algorithm may add random games to increase the diversity of the type of games suggested. Most-played games region 608 lists the games most often played in the social network (the PlayStation™ network in this example).

An advertising region 616 displays commercial messages. It should be appreciated that the embodiments illustrated in FIGS. 4-6 are exemplary browser layouts. Other embodiments may utilize different fields, or may arrange components in varying manners, such as replacing iconic buttons with hyperlinks. The embodiments illustrated in FIGS. 4-6 should therefore not be interpreted to be exclusive or limiting, but rather exemplary or illustrative.

FIG. 7 illustrates an input mapping table for translating commands received with alternate input devices, according to one embodiment. As previously discussed, most BBGs are designed for keyboard or mouse. The enhanced client for playing BBGs transforms inputs received from other devices into corresponding keyboard or mouse inputs that can be processed by the BBG. Thus, the keyboard and mouse inputs are emulated by the system for playing the game. In one embodiment, the input conversion module 222 in client 202 of FIG. 2A performs the input translation.

A typical BBG contains user instructions (explicit or embedded in the game) to show the user how to interact with the game. Thus, different inputs are mapped to specific game actions and a given input can result in more than one different actions according to the game state. The first column of input mapping table 702 includes the different possible game actions and the rest of the columns indicate the inputs required to cause this action in the game with the corresponding input device. The keyboard column indicates the keyboard key or keys that can generate this action. For example, action "Move left" can be obtained by pressing the "A" key or the left-arrow key in the keyboard.

Each of the subsequent columns defines a corresponding set of inputs for a specific alternate input device. For example, a jump action can be accomplished by a player jumping in the air when using body language recognition. The embodiment shown in FIG. 7 shows that most, if not all, actions can be performed via keyboard or mouse, but this is not always the case because often games are designed to be played with either the keyboard or the mouse. This means that some entries in input mapping table 702 will be empty. The requirement for playing a game with an alternate input device is that all actions defined for a BBG can be accomplished with the alternate input device. Further, if more than one alternate input device is being used, the requirement is that each game-defined action can be accomplished by at least one of the alternate input devices.

In some cases an action can be caused by a sequence or combination of inputs. For example, a double jump can be created by pressing the space bar twice in quick succession and activating a game object can be performed by simultaneously clicking two buttons on a mouse. In general, input sequences and combinations can be mapped to equivalent keyboard or mouse sequences and combinations, an input sequence can be mapped to one keyboard or mouse input, a single action (such as pressing a controller button) can be mapped to a keyboard or mouse sequence, etc. Additionally, sequences can be mapped to combinations, and vice versa. In fact, an input being translated can be mapped into multiple actions. For example, a gesture in a diagonal direction can be mapped into a horizontal move action and a vertical move action. Thus, any single input, sequence of inputs, or combination of inputs from the native device can be mapped to a single input, a sequence of inputs, or a combination of inputs from the alternate device, and vice versa.

In one embodiment, the input mapping table for a specific game is created once by a profiler and then made available from the web game server to other players. The profiler will test the game playing with the alternate input devices and make sure that the game can be played properly without any problems, such as input processing timing or screen resolution problems (for example, that a player does not move too slow or too fast to play the game properly.)

The input mapping tables are further customizable by users. A separate web page, or similar utility, is provided by the client device or the web game server to change the mappings. In one embodiment, the system presents all the game defined actions to the player and the player selects an input device or devices. For each action, the user selects from a pull-down menu from all the possible options for the given device. Once the mappings are updated, the user saves the mapping table in the client device (such as the game database) and future BBG games are played with the updated table. In another embodiment, users publish their input mapping tables in a community page to allow other users to take advantage of the work already done.

In one embodiment, the profiler defines a series of basic templates for different game categories. For example, one template is created for shooting games, another template is created for puzzle games, another template for fighting games, etc. When a player wishes to play a particular BBG, the player selects one of the templates as a starting point for playing the BBG. The template can then be customized, as previously discussed, and the final result is saved for playing the BBG. Optionally, the updated template can be made available to other players.

In another embodiment, a default template is provided by the system. Since BBGs are usually of low or medium complexity, the number of inputs tends to be limited and constant. BBGs are often designed to be simple and with a small learning curve. As a result a great majority of BBGs are played with the same keyboard or mouse commands. For example, a keyboard-based game will likely use the arrow keys, the space bar, and the Esc key exclusively. A mouse-based game will likely use the mouse motion and one button. For these simple BBGs, a default input mapping table is available for alternate input devices covering the basic keyboard and mouse inputs.

Figure 8:
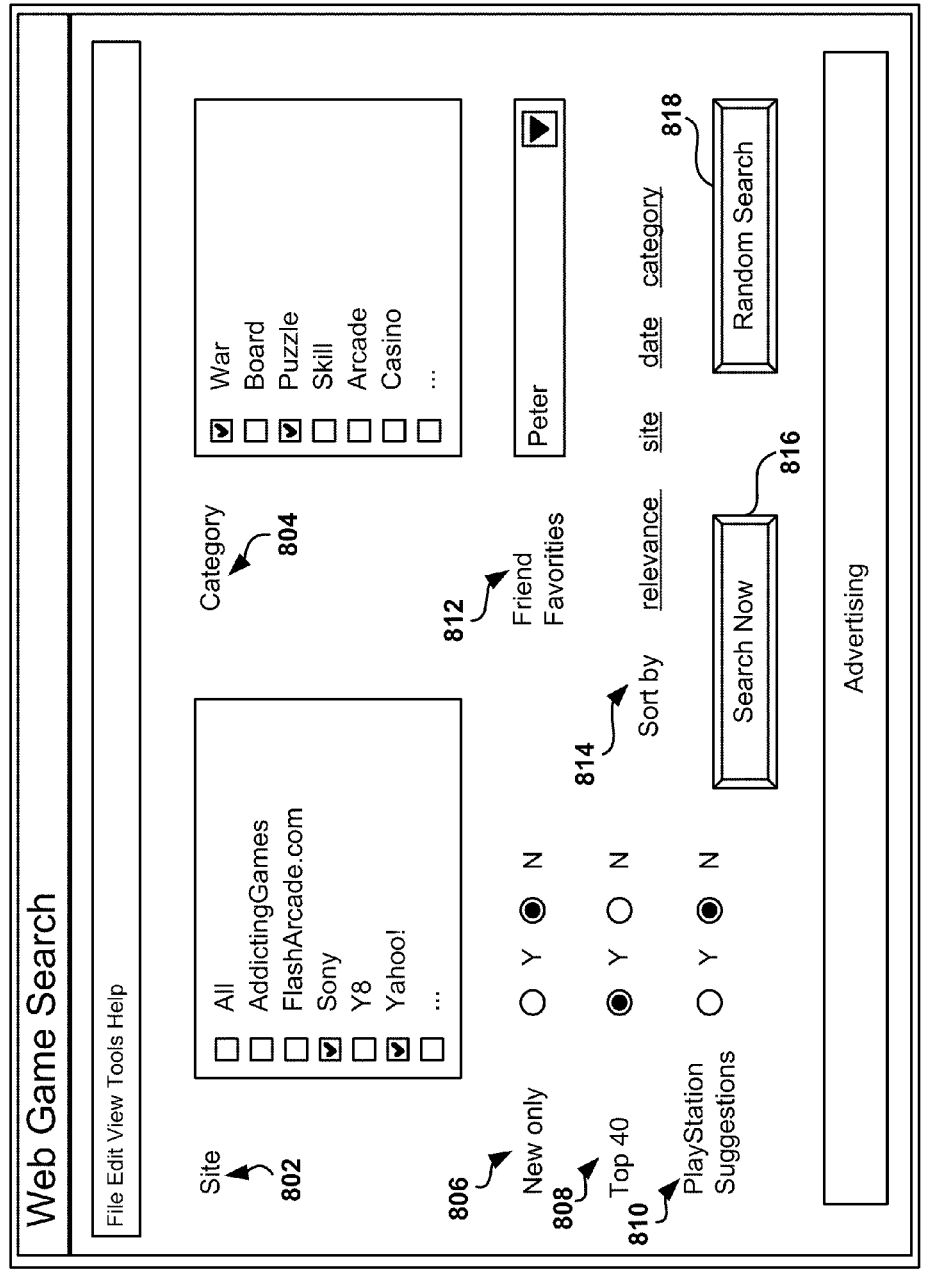
FIG. 8 shows a BBG searching page according to one embodiment.

FIG. 8 shows a BBG searching page according to one embodiment. The search page presents multiple search options to the player. The player may select one or more of these options simultaneously to perform a search. The player can search by game site 802 and select one website, a group of websites, or all websites. Category 804 search is used to search for games within a specific genre, such as war, board, puzzle, etc. The player can request new games 806 only, or search among the most popular games (top forty 808). Further, the player may wish to receive suggestions from the gaming community 810 or learn about games friends 812 are playing.

A sort 814 option allows the player to have the results sorted by relevance of the results, web site, date released, etc. A search now button 816 starts the game search once all the options are set. A random search button 818 generates a random game search, thus ignoring all the search options on the page.

The search can be performed by inspecting a local database, such as game database 212 of FIG. 2A, a database at a web game server 204, information on game websites, or a combination of them. It should be appreciated that the embodiments illustrated in FIG. 8 are exemplary. Other embodiments may utilize different fields, different selection options (check buttons, pull-down menus, etc.) or may arrange the fields in varying manners. The embodiments illustrated in FIG. 8 should therefore not be interpreted to be exclusive or limiting, but rather exemplary or illustrative.

Figure 9:
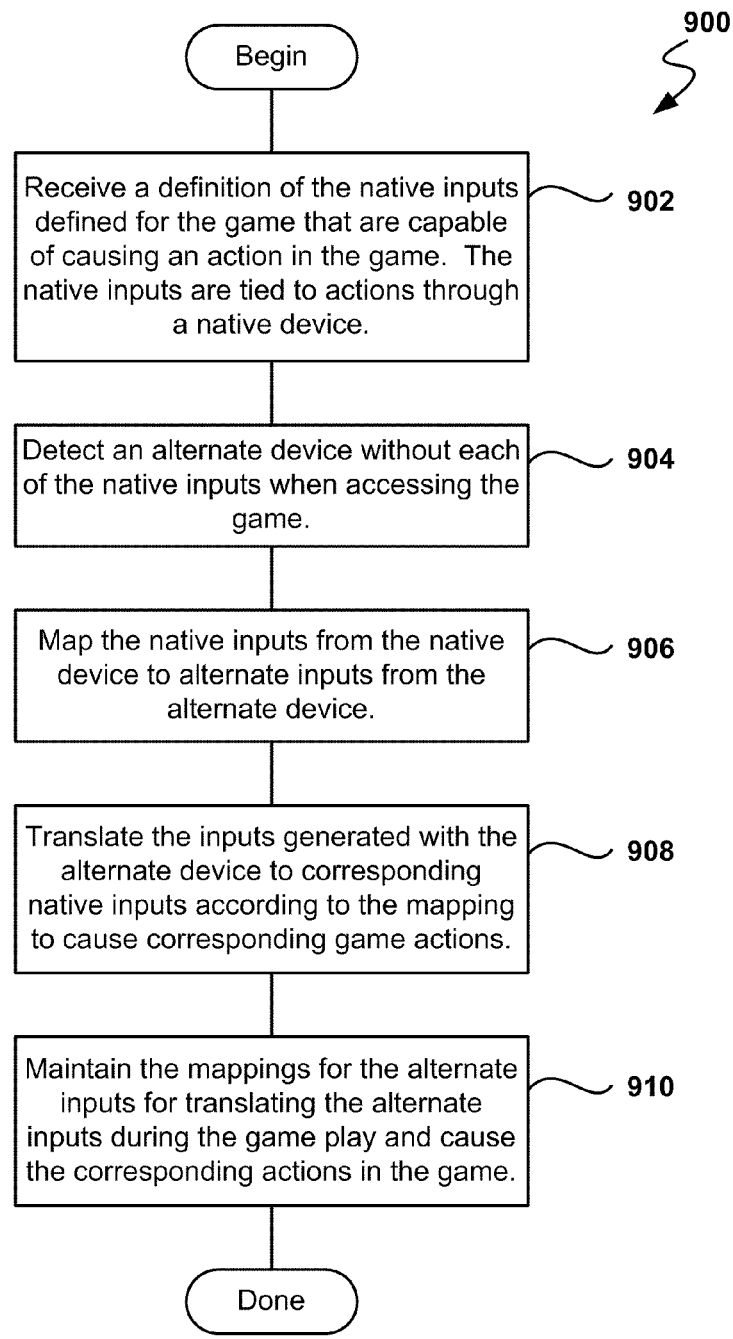
FIG. 9 shows the process flow for playing a BBG, in accordance with one embodiment of the invention.

FIG. 9 shows the process flow for playing a BBG, in accordance with one embodiment of the invention. In operation 902, a method operation receives a definition of native inputs defined for the game. These game inputs are capable of causing an action in the game, as shown for example in FIG. 7. The native inputs are generated by a native device. In one embodiment, the native device is a standard desktop computer input device such as a keyboard or a mouse.

Further, in operation 904, an alternate device is detected when accessing the game. The alternate device does not have the native inputs. In operation 906, a method operation maps the native inputs from the native device to a plurality of alternate inputs from the alternate device. The inputs generated with the alternate device are translated to corresponding native inputs in operation 908. The translation is performed according to the mapping previously performed to cause corresponding actions in the game. In operation 910, the mappings for the alternate inputs are maintained for translating the alternate inputs during the game play and cause the corresponding actions in the game.

Figure 10:
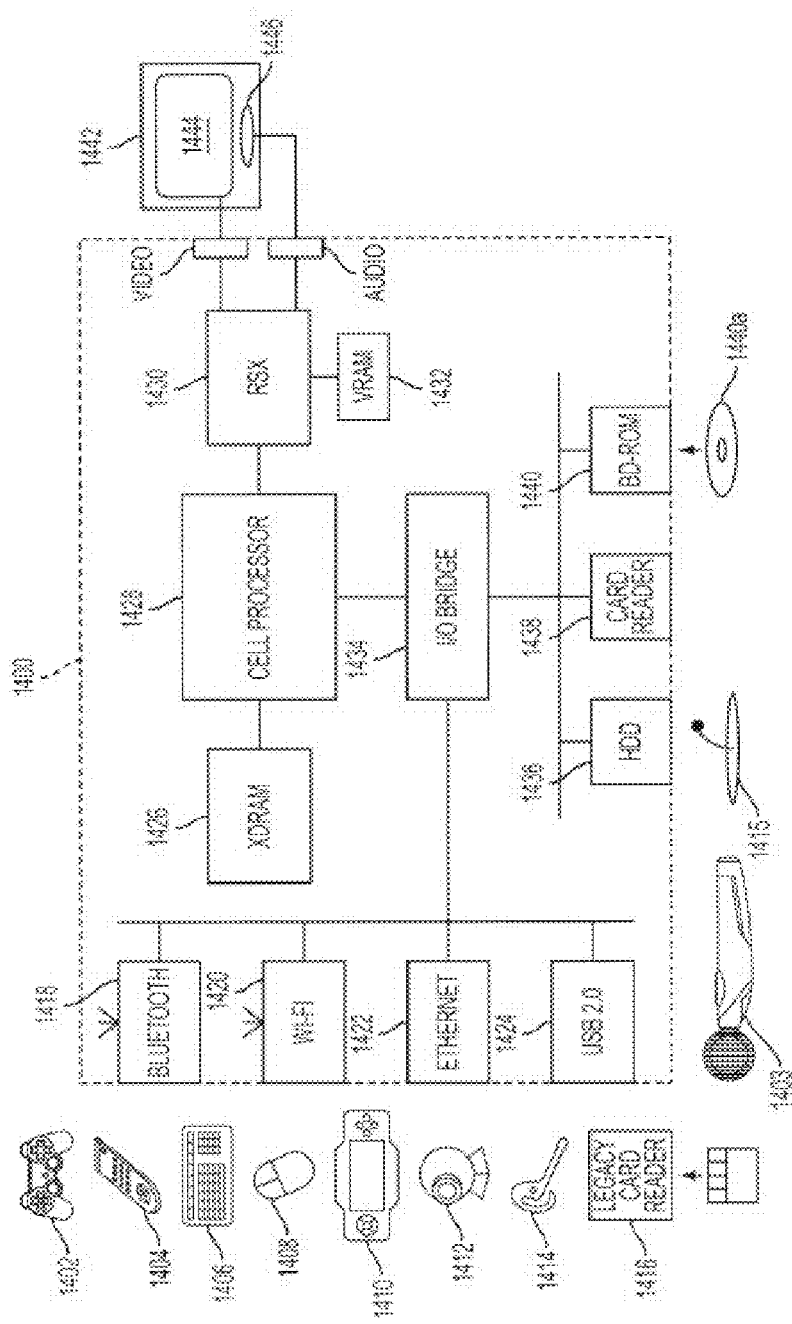
FIG. 10 illustrates hardware and user interfaces that may be used to play BBGs, in accordance with one embodiment of the invention.

FIG. 10 illustrates hardware and user interfaces that may be used to play BBGs, in accordance with one embodiment of the invention. FIG. 10 schematically illustrates the overall system architecture of the Sony® Playstation 3® entertainment device, a console that may be compatible for interfacing alternate input methods with a BBG in accordance with embodiments of the present invention. A system unit 1400 is provided, with various peripheral devices connectable to the system unit 1400. The system unit 1400 comprises: a Cell processor 1428; a Rambus® dynamic random access memory (XDRAM) unit 1426; a Reality Synthesizer graphics unit 1430 with a dedicated video random access memory (VRAM) unit 1432; and an I/O bridge 1434. The system unit 1400 also comprises a Blu Ray® Disk BD-ROM® optical disk reader 1440 for reading from a disk 1440a and a removable slot-in hard disk drive (HDD) 1436, accessible through the I/O bridge 1434. Optionally the system unit 1400 also comprises a memory card reader 1438 for reading compact flash memory cards, Memory Stick® memory cards and the like, which is similarly accessible through the I/O bridge 1434.

The I/O bridge 1434 also connects to six Universal Serial Bus (USB) 2.0 ports 1424; a gigabit Ethernet port 1422; an IEEE 802.11b/g wireless network (Wi-Fi) port 1420; and a Bluetooth® wireless link port 1418 capable of supporting of up to seven Bluetooth connections.

In operation, the I/O bridge 1434 handles all wireless, USB and Ethernet data, including data from one or more game controllers 1402-1403. For example when a user is playing a game, the I/O bridge 1434 receives data from the game controller 1402-1403 via a Bluetooth link and directs it to the Cell processor 1428, which updates the current state of the game accordingly.

The wireless, USB and Ethernet ports also provide connectivity for other peripheral devices in addition to game controllers 1402-1403, such as: a remote control 1404; a keyboard 1406; a mouse 1408; a portable entertainment device 1410 such as a Sony Playstation Portable® entertainment device; a video camera such as an EyeToy® video camera 1412; a microphone headset 1414; and a microphone 1415. Such peripheral devices may therefore in principle be connected to the system unit 1400 wirelessly; for example the portable entertainment device 1410 may communicate via a Wi-Fi ad-hoc connection, whilst the microphone headset 1414 may communicate via a Bluetooth link.

The provision of these interfaces means that the Playstation 3 device is also potentially compatible with other peripheral devices such as digital video recorders (DVRs), set-top boxes, digital cameras, portable media players, Voice over IP telephones, mobile telephones, printers and scanners.

In addition, a legacy memory card reader 1416 may be connected to the system unit via a USB port 1424, enabling the reading of memory cards 1448 of the kind used by the Playstation® or Playstation 2® devices.

The game controllers 1402-1403 are operable to communicate wirelessly with the system unit 1400 via the Bluetooth link, or to be connected to a USB port, thereby also providing power by which to charge the battery of the game controllers 1402-1403. Game controllers 1402-1403 can also include memory, a processor, a memory card reader, permanent memory such as flash memory, light emitters such as an illuminated spherical section, LEDs, or infrared lights, microphone and speaker for ultrasound communications, an acoustic chamber, a digital camera, an internal clock, a recognizable shape such as the spherical section facing the game console, and wireless communications using protocols such as Bluetooth®, WiFi™, etc.

Game controller 1402 is a controller designed to be used with two hands, and game controller 1403 is a single-hand controller with a ball attachment. In addition to one or more analog joysticks and conventional control buttons, the game controller is susceptible to three-dimensional location determination. Consequently gestures and movements by the user of the game controller may be translated as inputs to a game in addition to or instead of conventional button or joystick commands. Optionally, other wirelessly enabled peripheral devices such as the Playstation™ Portable device may be used as a controller. In the case of the Playstation™ Portable device, additional game or control information (for example, control instructions or number of lives) may be provided on the screen of the device. Other alternative or supplementary control devices may also be used, such as a dance mat (not shown), a light gun (not shown), a steering wheel and pedals (not shown) or bespoke controllers, such as a single or several large buttons for a rapid-response quiz game (also not shown).

The remote control 1404 is also operable to communicate wirelessly with the system unit 1400 via a Bluetooth link. The remote control 1404 comprises controls suitable for the operation of the Blu Ray™ Disk BD-ROM reader 1440 and for the navigation of disk content.

The Blu Ray™ Disk BD-ROM reader 1440 is operable to read CD-ROMs compatible with the Playstation and PlayStation 2 devices, in addition to conventional pre-recorded and recordable CDs, and so-called Super Audio CDs. The reader 1440 is also operable to read DVD-ROMs compatible with the Playstation 2 and PlayStation 3 devices, in addition to conventional pre-recorded and recordable DVDs. The reader 1440 is further operable to read BD-ROMs compatible with the Playstation 3 device, as well as conventional pre-recorded and recordable Blu-Ray Disks.

The system unit 1400 is operable to supply audio and video, either generated or decoded by the Playstation 3 device via the Reality Synthesizer graphics unit 1430, through audio and video connectors to a display and sound output device 1442 such as a monitor or television set having a display 1444 and one or more loudspeakers 1446. The audio connectors 1450 may include conventional analogue and digital outputs whilst the video connectors 1452 may variously include component video, S-video, composite video and one or more High Definition Multimedia Interface (HDMI) outputs. Consequently, video output may be in formats such as PAL or NTSC, or in 720p, 1080i or 1080p high definition.

Audio processing (generation, decoding and so on) is performed by the Cell processor 1428. The Playstation 3 device's operating system supports Dolby® 5.1 surround sound, Dolby® Theatre Surround (DTS), and the decoding of 7.1 surround sound from Blu-Ray® disks.

In the present embodiment, the video camera 1412 comprises a single charge coupled device (CCD), an LED indicator, and hardware-based real-time data compression and encoding apparatus so that compressed video data may be transmitted in an appropriate format such as an intra-image based MPEG (motion picture expert group) standard for decoding by the system unit 1400. The camera LED indicator is arranged to illuminate in response to appropriate control data from the system unit 1400, for example to signify adverse lighting conditions. Embodiments of the video camera 1412 may variously connect to the system unit 1400 via a USB, Bluetooth or Wi-Fi communication port. Embodiments of the video camera may include one or more associated microphones and also be capable of transmitting audio data. In embodiments of the video camera, the CCD may have a resolution suitable for high-definition video capture. In use, images captured by the video camera may for example be incorporated within a game or interpreted as game control inputs. In another embodiment the camera is an infrared camera suitable for detecting infrared light.

In general, in order for successful data communication to occur with a peripheral device such as a video camera or remote control via one of the communication ports of the system unit 1400, an appropriate piece of software such as a device driver should be provided. Device driver technology is well-known and will not be described in detail here, except to say that the skilled man will be aware that a device driver or similar software interface may be required in the present embodiment described.

Figure 11:
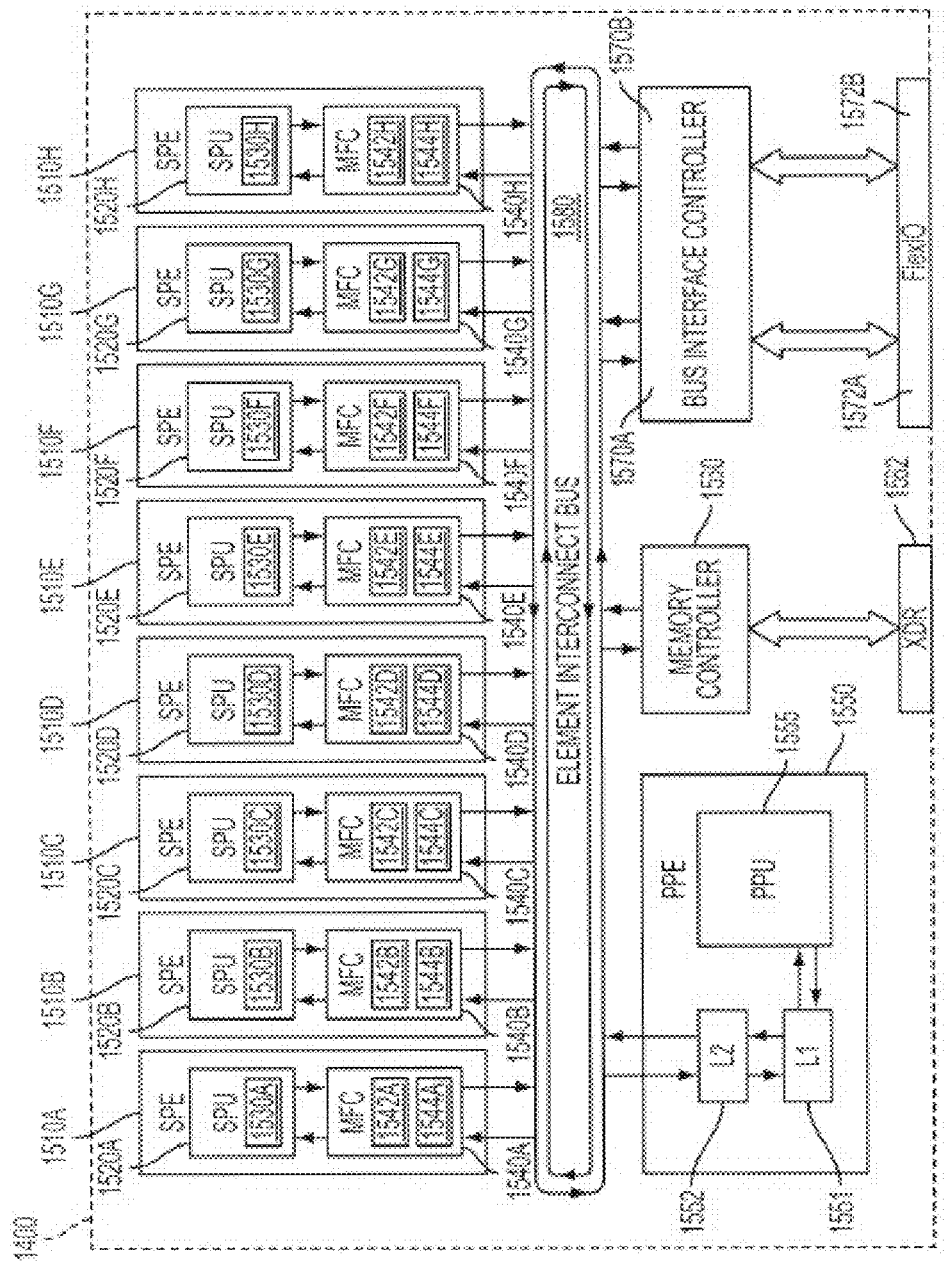
FIG. 11 illustrates additional hardware that may be used to process instructions, in accordance with one embodiment of the present invention.

FIG. 11 illustrates additional hardware that may be used to process instructions, in accordance with one embodiment of the present invention. Cell processor 1428 has an architecture comprising four basic components: external input and output structures comprising a memory controller 1560 and a dual bus interface controller 1570A, B; a main processor referred to as the Power Processing Element 1550; eight co-processors referred to as Synergistic Processing Elements (SPEs) 1510A-H; and a circular data bus connecting the above components referred to as the Element Interconnect Bus 1580. The total floating point performance of the Cell processor is 218 GFLOPS, compared with the 6.2 GFLOPs of the Playstation 2 device's Emotion Engine.

The Power Processing Element (PPE) 1550 is based upon a two-way simultaneous multithreading Power 1470 compliant PowerPC core (PPU) 1555 running with an internal clock of 3.2 GHz. It comprises a 512 kB level 2 (L2) cache and a 32 kB level 1 (L1) cache. The PPE 1550 is capable of eight single position operations per clock cycle, translating to 25.6 GFLOPs at 3.2 GHz. The primary role of the PPE 1550 is to act as a controller for the Synergistic Processing Elements 1510A-H, which handle most of the computational workload. In operation the PPE 1550 maintains a job queue, scheduling jobs for the Synergistic Processing Elements 1510A-H and monitoring their progress. Consequently each Synergistic Processing Element 1510A-H runs a kernel whose role is to fetch a job, execute it and synchronized with the PPE 1550.

Each Synergistic Processing Element (SPE) 1510A-H comprises a respective Synergistic Processing Unit (SPU) 1520A-H, and a respective Memory Flow Controller (MFC) 1540A-H comprising in turn a respective Dynamic Memory Access Controller (DMAC) 1542A-H, a respective Memory Management Unit (MMU) 1544A-H and a bus interface (not shown). Each SPU 1520A-H is a RIIC processor clocked at 3.2 GHz and comprising 256 kB local RAM 1530A-H, expandable in principle to 4 GB. Each SPE gives a theoretical 25.6 GFLOPS of single precision performance. An SPU can operate on 4 single precision floating point members, 4 32-bit numbers, 8 16-bit integers, or 16 8-bit integers in a single clock cycle. In the same clock cycle it can also perform a memory operation. The SPU 1520A-H does not directly access the system memory XDRAM 1426; the 64-bit addresses formed by the SPU 1520A-H are passed to the MFC 1540A-H which instructs its DMA controller 1542A-H to access memory via the Element Interconnect Bus 1580 and the memory controller 1560.

The Element Interconnect Bus (EIB) 1580 is a logically circular communication bus internal to the Cell processor 1428 which connects the above processor elements, namely the PPE 1550, the memory controller 1560, the dual bus interface 1570A,B and the 8 SPEs 1510A-H, totaling 12 participants. Participants can simultaneously read and write to the bus at a rate of 8 bytes per clock cycle. As noted previously, each SPE 1510A-H comprises a DMAC 1542A-H for scheduling longer read or write sequences. The EIB comprises four channels, two each in clockwise and anti-clockwise directions. Consequently for twelve participants, the longest step-wise data-flow between any two participants is six steps in the appropriate direction. The theoretical peak instantaneous EIB bandwidth for 12 slots is therefore 96B per clock, in the event of full utilization through arbitration between participants. This equates to a theoretical peak bandwidth of 307.2 GB/s (gigabytes per second) at a clock rate of 3.2 GHz.

The memory controller 1560 comprises an XDRAM interface 1562, developed by Rambus Incorporated. The memory controller interfaces with the Rambus XDRAM 1426 with a theoretical peak bandwidth of 25.6 GB/s.

The dual bus interface 1570A,B comprises a Rambus FlexIO® system interface 1572A,B. The interface is organized into 12 channels each being 8 bits wide, with five paths being inbound and seven outbound. This provides a theoretical peak bandwidth of 62.4 GB/s (36.4 GB/s outbound, 26 GB/s inbound) between the Cell processor and the I/O Bridge 700 via controller 170A and the Reality Simulator graphics unit 200 via controller 170B.

Data sent by the Cell processor 1428 to the Reality Simulator graphics unit 1430 will typically comprise display lists, being a sequence of commands to draw vertices, apply textures to polygons, specify lighting conditions, and so on.

Figure 12:
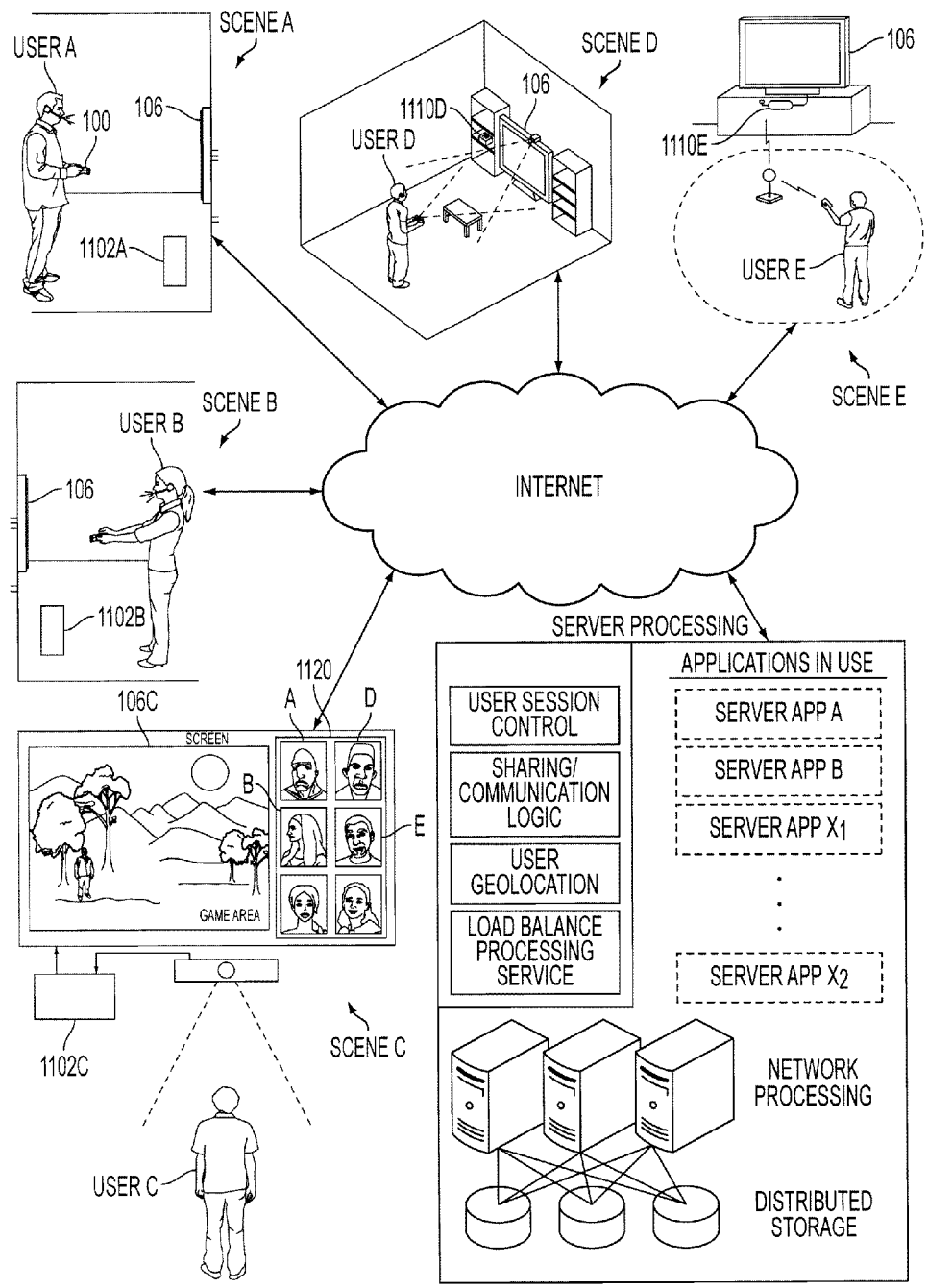
FIG. 12 is an exemplary illustration of scene A through scene E with respective user A through user E interacting with game clients 1102 that are connected to server processing via the internet, in accordance with one embodiment of the present invention.

FIG. 12 is an exemplary illustration of scene A through scene E with respective user A through user E interacting with game clients 1102 that are connected to server processing via the internet, in accordance with one embodiment of the present invention. A game client is a device that allows users to connect to server applications and processing via the internet. The game client allows users to access and playback online entertainment content such as but not limited to games, movies, music and photos. Additionally, the game client can provide access to online communications applications such as VOIP, text chat protocols, and email.

A user interacts with the game client via controller. In some embodiments the controller is a game client specific controller while in other embodiments, the controller can be a keyboard and mouse combination. In one embodiment, the game client is a standalone device capable of outputting audio and video signals to create a multimedia environment through a monitor/television and associated audio equipment. For example, the game client can be, but is not limited to a thin client, an internal PCI-express card, an external PCI-express device, an ExpressCard device, an internal, external, or wireless USB device, or a Firewire device, etc. In other embodiments, the game client is integrated with a television or other multimedia device such as a DVR, Blu-Ray player, DVD player or multi-channel receiver.

Within scene A of FIG. 19, user A interacts with a client application displayed on a monitor 106 using a controller 100 paired with game client 1102A. Similarly, within scene B, user B interacts with another client application that is displayed on monitor 106 using a controller 100 paired with game client 1102B. Scene C illustrates a view from behind user C as he looks at a monitor displaying a game and buddy list from the game client 1102C. While FIG. 19 shows a single server processing module, in one embodiment, there are multiple server processing modules throughout the world. Each server processing module includes sub-modules for user session control, sharing/communication logic, user geo-location, and load balance processing service. Furthermore, a server processing module includes network processing and distributed storage.

When a game client 1102 connects to a server processing module, user session control may be used to authenticate the user. An authenticated user can have associated virtualized distributed storage and virtualized network processing. Examples items that can be stored as part of a user's virtualized distributed storage include purchased media such as, but not limited to games, videos and music etc. Additionally, distributed storage can be used to save game status for multiple games, customized settings for individual games, and general settings for the game client. In one embodiment, the user geo-location module of the server processing is used to determine the geographic location of a user and their respective game client. The user's geographic location can be used by both the sharing/communication logic and the load balance processing service to optimize performance based on geographic location and processing demands of multiple server processing modules. Virtualizing either or both network processing and network storage would allow processing tasks from game clients to be dynamically shifted to underutilized server processing module(s). Thus, load balancing can be used to minimize latency associated with both recall from storage and with data transmission between server processing modules and game clients.

As shown in FIG. 19, the server processing module has instances of server application A and server application B. The server processing module is able to support multiple server applications as indicated by server application $X_1$ and server application $X_2$. In one embodiment, server processing is based on cluster computing architecture that allows multiple processors within a cluster to process server applications. In another embodiment, a different type of multi-computer processing scheme is applied to process the server applications. This allows the server processing to be scaled in order to accommodate a larger number of game clients executing multiple client applications and corresponding server applications. Alternatively, server processing can be scaled to accommodate increased computing demands necessitated by more demanding graphics processing or game, video compression, or application complexity. In one embodiment, the server processing module performs the majority of the processing via the server application. This allows relatively expensive components such as graphics processors, RAM, and general processors to be centrally located and reduces to the cost of the game client. Processed server application data is sent back to the corresponding game client via the internet to be displayed on a monitor.

Scene C illustrates an exemplary application that can be executed by the game client and server processing module. For example, in one embodiment game client 1102C allows user C to create and view a buddy list 1120 that includes user A, user B, user D and user E. As shown, in scene C, user C is able to see either real time images or avatars of the respective user on monitor 106C. Server processing executes the respective applications of game client 1102C and with the respective game clients 1102 of users A, user B, user D and user E. Because the server processing is aware of the applications being executed by game client B, the buddy list for user A can indicate which game user B is playing. Further still, in one embodiment, user A can view actual in game video directly from user B. This is enabled by merely sending processed server application data for user B to game client A in addition to game client B.

In addition to being able to view video from buddies, the communication application can allow real-time communications between buddies. As applied to the previous example, this allows user A to provide encouragement or hints while watching real-time video of user B. In one embodiment two-way real time voice communication is established through a client/server application. In another embodiment, a client/server application enables text chat. In still another embodiment, a client/server application converts speech to text for display on a buddy's screen.

Scene D and scene E illustrate respective user D and user E interacting with game consoles 1110D and 1110E respectively. Each game console 1110D and 1110E are connected to the server processing module and illustrate a network where the server processing modules coordinates game play for both game consoles and game clients.

Figure 13:
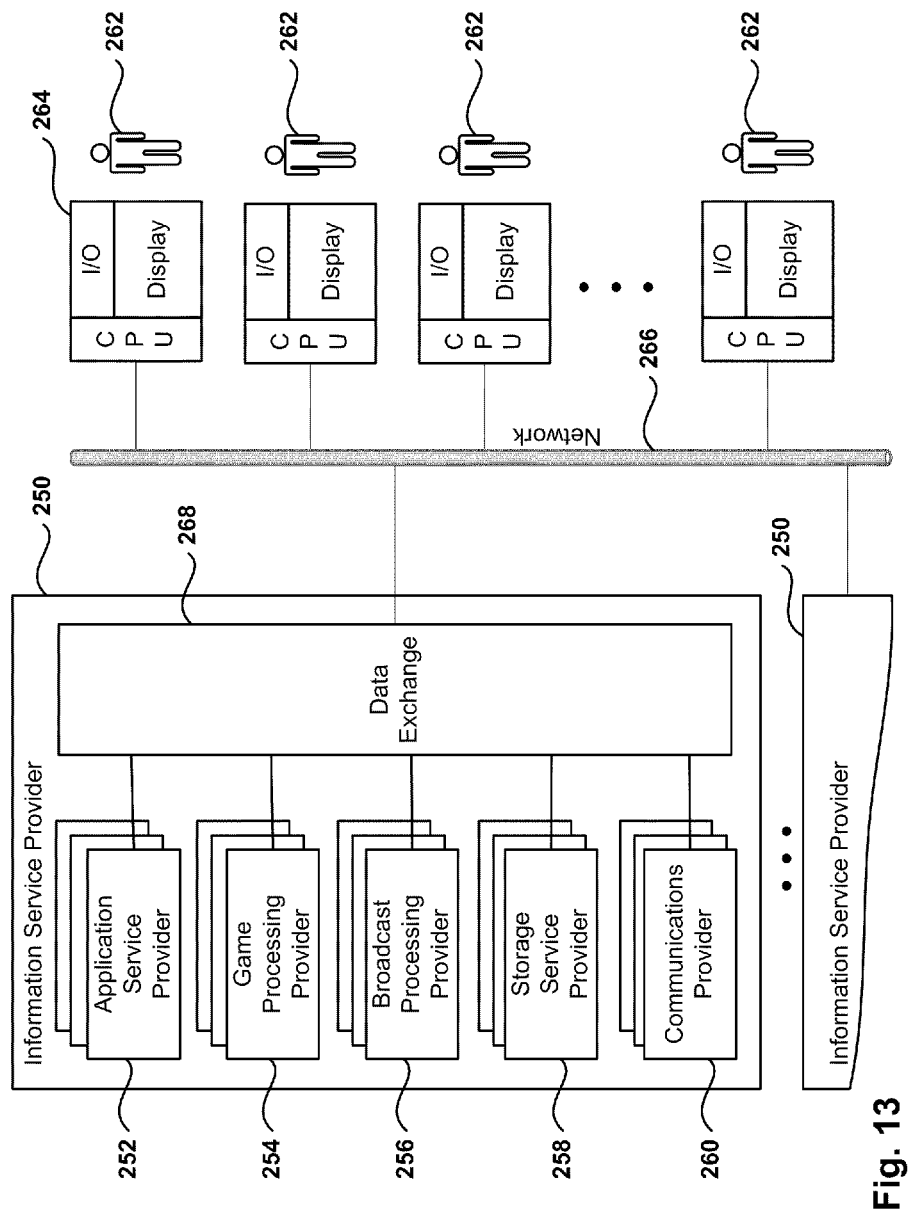
FIG. 13 illustrates an embodiment of an Information Service Provider architecture.

FIG. 13 illustrates an embodiment of an Information Service Provider architecture. Information Service Providers (ISP) 250 delivers a multitude of information services to users 262 geographically dispersed and connected via network

266. An ISP can deliver just one type of service, such as stock price updates, or a variety of services such as broadcast media, news, sports, gaming, etc. Additionally, the services offered by each ISP are dynamic, that is, services can be added or taken away at any point in time. Thus, the ISP providing a particular type of service to a particular individual can change over time. For example, a user may be served by an ISP in near proximity to the user while the user is in her home town, and the user may be served by a different ISP when the user travels to a different city. The home-town ISP will transfer the required information and data to the new ISP, such that the user information "follows" the user to the new city making the data closer to the user and easier to access. In another embodiment, a master-server relationship may be established between a master ISP, which manages the information for the user, and a server ISP that interfaces directly with the user under control from the master ISP. In other embodiment, the data is transferred from one ISP to another ISP as the client moves around the world to make the ISP in better position to service the user be the one that delivers these services.

ISP 250 includes Application Service Provider (ASP) 252, which provides computer-based services to customers over a network. Software offered using an ASP model is also sometimes called on-demand software or software as a service (SaaS). A simple form of providing access to a particular application program (such as customer relationship management) is by using a standard protocol such as HTTP. The application software resides on the vendor's system and is accessed by users through a web browser using HTML, by special purpose client software provided by the vendor, or other remote interface such as a thin client.

Services delivered over a wide geographical area often use cloud computing. Cloud computing is a style of computing in which dynamically scalable and often virtualized resources are provided as a service over the Internet. Users do not need to be an expert in the technology infrastructure in the "cloud" that supports them. Cloud computing can be divided in different services, such as Infrastructure as a Service (IaaS), Platform as a Service (PaaS), and Software as a Service (SaaS). Cloud computing services often provide common business applications online that are accessed from a web browser, while the software and data are stored on the servers. The term cloud is used as a metaphor for the Internet, based on how the Internet is depicted in computer network diagrams and is an abstraction for the complex infrastructure it conceals.

Further, ISP 250 includes a Game Processing Server (GPS) 254 which is used by game clients to play single and multiplayer video games. Most video games played over the Internet operate via a connection to a game server. Typically, games use a dedicated server application that collects data from players and distributes it to other players. This is more efficient and effective than a peer-to-peer arrangement, but it requires a separate server to host the server application. In another embodiment, the GPS establishes communication between the players and their respective game-playing devices exchange information without relying on the centralized GPS.

Dedicated GPSs are servers which run independently of the client. Such servers are usually run on dedicated hardware located in data centers, providing more bandwidth and dedicated processing power. Dedicated servers are the preferred method of hosting game servers for most PC-based multiplayer games. Massively multiplayer online games run on dedicated servers usually hosted by the software company that owns the game title, allowing them to control and update content.

Broadcast Processing Server (BPS) 256 distributes audio or video signals to an audience. Broadcasting to a very narrow range of audience is sometimes called narrowcasting. The final leg of broadcast distribution is how the signal gets to the listener or viewer, and it may come over the air as with a radio station or TV station to an antenna and receiver, or may come through cable TV or cable radio (or "wireless cable") via the station or directly from a network. The Internet may also bring either radio or TV to the recipient, especially with multicasting allowing the signal and bandwidth to be shared. Historically, broadcasts have been delimited by a geographic region, such as national broadcasts or regional broadcast. However, with the proliferation of fast internet, broadcasts are not defined by geographies as the content can reach almost any country in the world.

Storage Service Provider (SSP) 258 provides computer storage space and related management services. SSPs also offer periodic backup and archiving. By offering storage as a service, users can order more storage as required. Another major advantage is that SSPs include backup services and users will not lose all their data if their computers' hard drives fail. Further, a plurality of SSPs can have total or partial copies of the user data, allowing users to access data in an efficient way independently of where the user is located or the device being used to access the data. For example, a user can access personal files in the home computer, as well as in a mobile phone while the user is on the move.

Communications Provider 260 provides connectivity to the users. One kind of Communications Provider is an Internet Service Provider (ISP) which offers access to the Internet. The ISP connects its customers using a data transmission technology appropriate for delivering Internet Protocol datagrams, such as dial-up, DSL, cable modem, wireless or dedicated high-speed interconnects. The Communications Provider can also provide messaging services, such as e-mail, instant messaging, and SMS texting. Another type of Communications Provider is the Network Service provider (NSP) which sells bandwidth or network access by providing direct backbone access to the Internet. Network service providers may consist of telecommunications companies, data carriers, wireless communications providers, Internet service providers, cable television operators offering high-speed Internet access, etc.

Data Exchange 268 interconnects the several modules inside ISP 253 and connects these modules to users 262 via network 266. Data Exchange 268 can cover a small area where all the modules of ISP 250 are in close proximity, or can cover a large geographic area when the different modules are geographically dispersed. For example, Data Exchange 268 can include a fast Gigabit Ethernet (or faster) within a cabinet of a data center, or an intercontinental virtual area network (VLAN).

Users 262 access the remote services with client device 264, which includes at least a CPU, a display and I/O. The client device can be a PC, a mobile phone, a netbook, a PDA, etc. In one embodiment, ISP 250 recognizes the type of device used by the client and adjusts the communication method employed. In other cases, client devices use a standard communications method, such as html, to access ISP 250.

Embodiments of the present invention may be practiced with various computer system configurations including handheld devices, microprocessor systems, microprocessor-based or programmable consumer electronics, minicomputers, mainframe computers and the like. The invention can also be practiced in distributed computing environments where tasks are performed by remote processing devices that are linked through a network.

With the above embodiments in mind, it should be understood that the invention can employ various computer-implemented operations involving data stored in computer systems. These operations are those requiring physical manipulation of physical quantities. Any of the operations described herein that form part of the invention are useful machine operations. The invention also relates to a device or an apparatus for performing these operations. The apparatus may be specially constructed for the required purpose, such as a special purpose computer. When defined as a special purpose computer, the computer can also perform other processing, program execution or routines that are not part of the special purpose, while still being capable of operating for the special purpose. Alternatively, the operations may be processed by a general purpose computer selectively activated or configured by one or more computer programs stored in the computer memory, cache, or obtained over a network. When data is obtained over a network the data maybe processed by other computers on the network, e.g., a cloud of computing resources.

The embodiments of the present invention can also be defined as a machine that transforms data from one state to another state. The transformed data can be saved to storage and then manipulated by a processor. The processor thus transforms the data from one thing to another. Still further, the methods can be processed by one or more machines or processors that can be connected over a network. Each machine can transform data from one state or thing to another, and can also process data, save data to storage, transmit data over a network, display the result, or communicate the result to another machine.

Although the method operations were described in a specific order, it should be understood that other housekeeping operations may be performed in between operations, or operations may be adjusted so that they occur at slightly different times, or may be distributed in a system which allows the occurrence of the processing operations at various intervals associated with the processing, as long as the processing of the overlay operations are performed in the desired way.

Although the foregoing invention has been described in some detail for purposes of clarity of understanding, it will be apparent that certain changes and modifications can be practiced within the scope of the appended claims. Accordingly, the present embodiments are to be considered as illustrative and not restrictive, and the invention is not to be limited to the details given herein, but may be modified within the scope and equivalents of the appended claims.

What is claimed is:

1. A method for playing a browser based game (BBG), the method comprising:
   receiving a definition of native inputs defined for the game and capable of causing an action in the game, the native inputs being tied to actions through a native device;
   detecting an alternate device, wherein the game lacks capability to be fully played with the alternate device;
   mapping the native inputs from the native device to a plurality of alternate inputs from the alternate device; and
   translating inputs generated with the alternate device to corresponding native inputs according to the mapping to cause corresponding actions during game play, wherein the translating enables the game to be played with the alternate device, wherein the mappings for the alternate inputs are maintained for translating the alternate inputs during the game play to cause the corresponding actions in the game.

2. The method as recited in claim 1, further including:
   detecting a different alternate device being used by a player; and
   remapping the native inputs to alternate inputs from the different alternate device.

3. The method as recited in claim 1, further including:
   identifying a game area inside a web page for playing the game; and
   expanding the game area by increasing a size of the game area while decreasing a size of other elements in the web page.

4. The method as recited in claim 1, wherein the native device is an entry input device that includes one or more of buttons, keys, a touchpad, a joystick, a roller ball, or an optical motion sensor.

5. The method as recited in claim 1, wherein the native device is selected from a group consisting of a keyboard or a mouse.

6. The method as recited in claim 1, wherein the alternate device is selected from a group consisting of a game controller, a game controller movement detecting camera, a player motion detecting camera, a voice command detecting microphone, a remote control, a telephone keypad, or a touch-sensitive screen.

7. The method as recited in claim 1, wherein mapping the native inputs further includes:
   receiving an input layout of the alternate device; and
   for each of the native inputs in the definition of native inputs, mapping the each native input to a different alternate input from the input layout of the alternate device.

8. The method as recited in claim 1, further including:
   adding an option to save the game in a web page downloaded for the BBG;
   saving a status of the game when the option to save the game is selected; and
   restoring the game using the status to continue playing the game.

9. The method as recited in claim 8, further including:
   adding commercial content to the web page at a computing device running the game.

10. The method as recited in claim 1, further including:
    saving a history of games played and resulting scores at a console where the game is executing.

11. The method as recited in claim 10, further including:
    sending the history to a central game server;
    collecting game statistics based on the history; and
    making the game statistics available to a community of players.

12. The method as recited in claim 10, further including:
    creating, at the console, a local custom web page including the history and resulting scores of games played; and
    displaying the local custom web page.

13. The method as recited in claim 12, wherein the local custom web page further includes:
    games saved, favorite games, most popular games, and game suggestions.

14. The method as recited in claim 1, further including:
    collecting information about available games on the internet; and
    displaying a game search web page for finding games on the internet, wherein the game search web page includes search options selected from a group consisting of game site, game category, new games, most popular games, recommended games, or games played by friends.

15. A method for playing a browser based game (BBG), the method comprising:
receiving input parameters for the game;
determining native inputs for the input parameters, the native inputs being defined for a native input control device;
mapping the native inputs to alternate inputs from a non-native control device, wherein the game lacks capability to be fully played with the non-native control device;
detecting input from the non-native control device; and
translating the detected input to native; inputs during game play, wherein the translating enables the game to be played with the non-native control device, wherein the mappings for the native inputs are maintained for translating the detected inputs during the game play to simulate the native input control device with the non-native control device.

16. The method as recited in claim 15, further including:
detecting a different non-native control device being used by a player; and
remapping the native inputs to the different non-native control device.

17. The method as recited in claim 15, further including:
defining an input mapping table that identifies the mapping between the input parameters, the native inputs, and the alternate inputs from the non-native control device.

18. A system for playing a browser based game (BBG), the system comprising:
a game information retrieval module that receives a definition of native inputs for the game, the native inputs capable of causing an action in the game and being tied to actions through a native device; and
an input conversion module that maps the native inputs from the native device to a plurality of alternate inputs from an alternate device which does not have the native inputs, wherein the game lacks capability to be fully played with the alternate device, wherein the input conversion module translates inputs generated with the alternate device to corresponding native inputs according to the mapped native inputs, wherein the translated inputs enable the game to be played with the alternate device.

19. The system of claim 18, further including:
an internet browser configured to download the game which is embedded in a web page.

20. The system of claim 19, further including:
a game processor configured to,
identify a game area inside the web page for playing the game, and
display and expanded game area by increasing a size of the game area while decreasing a size of other elements in the web page.

21. The system of claim 18, wherein the input conversion module further includes:
a device table, each entry in the device table including an input layout for a corresponding device;
a game inputs table, each entry in the game inputs table including a definition given by BBG provider to play with the native device; and
a mappings table, each entry in the mappings table describing a mapping between a native device and an alternate device to play a corresponding game.

22. The system of claim 21, wherein the input conversion module further includes an arbiter, the arbiter configured to:
scan the mapping table for matches of native inputs to alternate inputs;
associate the native inputs with the alternate inputs using the mapping table;
map un-mapped native inputs with information obtained from a server; and
display a graphical representation of the mappings for the alternate inputs.

23. The system of claim 18, further including:
a server configured to,
collect information on web games available from multiple web sites;
collect results of games played; and
generate statistics based on the collected results.

24. The system of claim 23, wherein the server is further configured to collect game ratings from players.

25. A computer program embedded in a computer-readable storage medium, when executed by one or more processors, for playing a browser based game (BBG), the computer program comprising:
program instructions for receiving a definition of native inputs defined for the game and capable of causing an action in the game, the native inputs being tied to actions through a native device;
program instructions for mapping the native inputs from the native device to a plurality of alternate inputs from an alternate device, wherein the game lacks capability to be fully played with the alternate device; and
program instructions for translating inputs generated with the alternate device to corresponding native inputs according to the mapping to cause corresponding actions during game play, wherein the translating enables the game to be played with the alternate device, wherein the mappings for the alternate inputs are maintained for translating the alternate inputs during the game play to cause the corresponding actions in the game.

26. The computer program as recited in claim 25, further including:
program instructions for customizing the mapping from the native inputs to the plurality of alternate inputs from the alternate device.

27. The computer program as recited in claim 25, further including:
program instructions for defining input mapping templates, wherein each template corresponds to a game category.

* * * * *